(12) United States Patent
Malofsky et al.

(10) Patent No.: US 7,141,768 B2
(45) Date of Patent: Nov. 28, 2006

(54) FASTENING DEVICE

(75) Inventors: Adam G. Malofsky, Loveland, OH (US); Bernard M. Malofsky, Bloomfield, CT (US); William H. Mann, Hopkinton, NH (US)

(73) Assignee: Nexicor, LLC, Loveland, OH (US)

( * ) Notice: Subject to any disclaimer, the term of this patent is extended or adjusted under 35 U.S.C. 154(b) by 226 days.

(21) Appl. No.: 09/840,859

(22) Filed: Apr. 24, 2001

(65) Prior Publication Data

US 2002/0031644 A1 Mar. 14, 2002

Related U.S. Application Data

(60) Provisional application No. 60/201,078, filed on Apr. 28, 2000.

(51) Int. Cl.
*H05B 6/10* (2006.01)
*B32B 7/12* (2006.01)

(52) U.S. Cl. ............... 219/645; 219/635; 219/639; 219/643; 428/343; 428/344; 428/349; 428/458; 428/461; 428/474.4; 428/480

(58) Field of Classification Search ......... 428/343, 428/344, 346, 349, 353, 354, 131, 480, 474.4, 428/458, 461; 219/635, 638, 643, 645
See application file for complete search history.

(56) References Cited

U.S. PATENT DOCUMENTS

| | | | |
|---|---|---|---|
| 2,378,801 A | 6/1945 | Sidell et al. | |
| 2,393,541 A | 1/1946 | Kohler | |
| 3,391,846 A | 7/1968 | White | |
| 3,395,261 A | 7/1968 | Leatherman et al. | |
| 3,510,619 A | 5/1970 | Leatherman | |
| 3,562,054 A | 2/1971 | Wolf | |
| 3,574,031 A | 4/1971 | Heller, Jr. et al. | 156/273 |
| 3,612,803 A | 10/1971 | Klaas | 219/10.53 |
| 3,620,875 A | 11/1971 | Guglielmo, Sr. et al. | |
| 3,620,876 A | 11/1971 | Guglielmo, Sr. et al. | |
| 3,657,038 A | 4/1972 | Lightfoot | |
| 3,671,371 A | 6/1972 | Wolf | |
| 3,727,022 A | 4/1973 | Hamilton | |
| 3,733,231 A | 5/1973 | Rukowski et al. | |
| 3,750,728 A | 8/1973 | Stark | |
| 3,833,439 A | 9/1974 | Smith | |
| 3,902,940 A | 9/1975 | Heller, Jr. et al. | |
| 3,907,733 A * | 9/1975 | Jackson, Jr. et al. | 260/220 |
| 3,996,402 A | 12/1976 | Sindt | 428/140 |
| 4,017,701 A | 4/1977 | Mittelmann | 219/10.49 |

(Continued)

FOREIGN PATENT DOCUMENTS

AT    321432    3/1975

(Continued)

*Primary Examiner*—Daniel Zirker
(74) *Attorney, Agent, or Firm*—Edward K. Welch, II

(57) ABSTRACT

A device for fastening surfaces together in an effective, efficient, and preferably reversible bond is disclosed. This device is particularly useful in the construction industry for fastening roll goods, such as wall coverings, or mill work, such as moldings, to surfaces, such as walls. The fastening device comprises a susceptor sheet, preferably having a thickness of no greater than about 2 mils, and a heat-activateable adhesive on at least one surface of the susceptor, wherein adhesive is placed on the substrate in a very carefully and specifically-defined manner. The fastening device is activated by induction heating, preferably by a hand-held induction tool. The method of fastening surfaces together utilizing the fastening device described above is also disclosed.

46 Claims, 6 Drawing Sheets

U.S. PATENT DOCUMENTS

| | | | |
|---|---|---|---|
| 4,029,837 | A | 6/1977 | Leatherman |
| 4,038,120 | A | 7/1977 | Russell ........................ 156/71 |
| 4,120,712 | A | 10/1978 | Sindt |
| 4,123,305 | A | 10/1978 | Krzeszowski ................. 156/71 |
| 4,164,599 | A | 8/1979 | Kessler |
| 4,416,713 | A | 11/1983 | Brooks |
| 4,418,260 | A | 11/1983 | Detrick |
| 4,420,352 | A | 12/1983 | Schroeder et al. |
| 4,461,661 | A | 7/1984 | Fabel |
| 4,483,896 | A | 11/1984 | Gray et al. |
| 4,514,243 | A | 4/1985 | Moore, III et al. |
| 4,602,139 | A | 7/1986 | Hutton et al. |
| 4,610,906 | A | 9/1986 | Brooks |
| 4,650,947 | A | 3/1987 | Hutton et al. |
| 4,657,451 | A | 4/1987 | Tanaka |
| 4,710,539 | A | 12/1987 | Siadat et al. |
| 4,749,833 | A | 6/1988 | Novorsky et al. |
| 4,762,864 | A | 8/1988 | Goel et al. |
| 4,765,859 | A | 8/1988 | Heath et al. |
| 4,841,706 | A | 6/1989 | Resan |
| 4,846,916 | A | 7/1989 | Kobayashi et al. |
| 4,853,510 | A | 8/1989 | Mohr et al. |
| 4,871,412 | A | 10/1989 | Felix et al. |
| 4,878,978 | A | 11/1989 | Goel et al. |
| 4,906,497 | A | 3/1990 | Hellmann et al. ............. 428/49 |
| 4,941,936 | A | 7/1990 | Wilkinson et al. |
| 4,961,796 | A | 10/1990 | Perrin et al. |
| 4,969,968 | A | 11/1990 | Leatherman |
| 5,123,989 | A | 6/1992 | Horiishi et al. |
| 5,129,977 | A | 7/1992 | Leatherman |
| 5,133,630 | A | 7/1992 | Hughes |
| 5,182,134 | A | 1/1993 | Sato |
| 5,198,053 | A | 3/1993 | Duncan |
| 5,229,562 | A | 7/1993 | Burnett et al. |
| 5,254,824 | A | 10/1993 | Chamberlain et al. |
| 5,294,763 | A | 3/1994 | Chamberlain et al. |
| 5,310,977 | A | 5/1994 | Stenkamp et al. |
| 5,328,539 | A | 7/1994 | Sato |
| 5,340,428 | A | 8/1994 | Kodokian |
| 5,350,902 | A | 9/1994 | Fox et al. ................... 219/633 |
| 5,374,808 | A | 12/1994 | Coultrip et al. ............. 219/633 |
| 5,374,809 | A | 12/1994 | Fox et al. ................... 219/633 |
| 5,378,879 | A | 1/1995 | Monovoukas ............... 219/634 |
| 5,410,132 | A | 4/1995 | Gregg et al. |
| 5,410,133 | A | 4/1995 | Matsen et al. |
| 5,420,400 | A | 5/1995 | Matsen |
| 5,438,181 | A | 8/1995 | Volkmann et al. |
| 5,481,091 | A | 1/1996 | Grimm et al. |
| 5,486,684 | A | 1/1996 | Peterson et al. |
| 5,500,511 | A | 3/1996 | Hansen et al. ............... 219/633 |
| 5,508,496 | A | 4/1996 | Hansen et al. ............... 219/633 |
| 5,526,624 | A | 6/1996 | Berg |
| 5,530,227 | A | 6/1996 | Matsen et al. |
| 5,534,097 | A | 7/1996 | Fasano et al. |
| 5,538,581 | A | 7/1996 | Gallant |
| 5,548,026 | A | 8/1996 | Jorissen et al. |
| 5,599,472 | A | 2/1997 | Brown et al. |
| 5,681,128 | A | 10/1997 | Morgan et al. |
| 5,705,795 | A | 1/1998 | Anderson et al. ........... 219/633 |
| 5,705,796 | A | 1/1998 | Hansen et al. ............... 219/633 |
| 5,717,191 | A | 2/1998 | Christensen et al. ........ 219/634 |
| 5,723,849 | A | 3/1998 | Matsen et al. ............... 219/634 |
| 5,756,973 | A | 5/1998 | Kirkwood et al. .......... 219/634 |
| 5,760,379 | A | 6/1998 | Matsen et al. |
| 5,770,296 | A | 6/1998 | Remerowski et al. ......... 428/80 |
| 5,837,088 | A | 11/1998 | Palmgren et al. |
| 5,847,375 | A | 12/1998 | Matsen et al. ............... 219/635 |
| 5,874,713 | A | 2/1999 | Cydzik et al. ............... 219/633 |
| 5,916,469 | A | 6/1999 | Scoles et al. ................ 219/633 |
| 5,919,387 | A | 7/1999 | Buckley et al. ............. 219/633 |
| 5,919,413 | A | 7/1999 | Avila ........................ 264/249 |
| 5,932,057 | A | 8/1999 | Remerowski et al. ..... 156/272.4 |
| 5,935,369 | A | 8/1999 | Remerowski et al. ..... 156/272.4 |
| 5,938,386 | A | 8/1999 | Remerowski et al. ......... 411/92 |
| 5,985,082 | A | 11/1999 | Remerowski et al. |
| 5,985,083 | A | 11/1999 | Remerowski et al. |
| 6,007,661 | A | 12/1999 | Remerowski et al. |
| 6,007,662 | A | 12/1999 | Remerowski et al. |
| 6,007,663 | A | 12/1999 | Remerowski et al. |
| 6,024,822 | A | 2/2000 | Alper et al. .............. 156/273.3 |
| 6,043,469 | A | 3/2000 | Fink et al. |
| 6,045,648 | A | 4/2000 | Palmgren et al. |
| 6,048,599 | A | 4/2000 | Chu et al. |
| 6,056,844 | A | 5/2000 | Guiles et al. |
| 6,066,699 | A | 5/2000 | Marhevka |
| 6,083,558 | A | 7/2000 | Bremont |
| 6,110,565 | A | 8/2000 | Matthews |
| 6,121,592 | A | 9/2000 | Fishman et al. |
| 6,229,127 | B1 | 5/2001 | Link |
| 6,284,089 | B1 | 9/2001 | Anderson et al. |
| 6,302,178 | B1 | 10/2001 | Givens |
| 6,323,468 | B1 | 11/2001 | Dabelstein et al. |
| 6,338,232 | B1 | 1/2002 | Yamanaka et al. |
| 2002/0002805 | A1 | 1/2002 | Yamaguchi et al. |

FOREIGN PATENT DOCUMENTS

| | | |
|---|---|---|
| AU | 57288 80 A | 11/1980 |
| DE | 1761776 | 1/1971 |
| DE | 3831787 | 4/1989 |
| DE | 4029724 | 3/1992 |
| EP | 0128837 | 12/1984 |
| EP | 0 237 657 A1 | 9/1987 |
| EP | 0289632 | 11/1988 |
| EP | 0314548 | 5/1989 |
| EP | 0440410 | 8/1991 |
| EP | 0735210 | 10/1996 |
| FR | 842289 | 6/1939 |
| FR | 1558393 | 2/1969 |
| GB | 979283 | 1/1965 |
| GB | 984038 | 2/1965 |
| GB | 1087815 | 10/1967 |
| GB | 1205221 | 9/1970 |
| GB | 1267198 | 3/1972 |
| GB | 1 499 801 | 2/1978 |
| GB | 2103995 | 3/1983 |
| JP | 56148520 | 11/1981 |
| JP | 56148521 | 11/1981 |
| JP | 57046843 | 3/1982 |
| JP | 57 073064 A | 5/1982 |
| JP | 58093768 | 6/1983 |
| JP | 59184611 | 10/1984 |
| JP | 61160229 | 7/1986 |
| JP | 62025036 | 2/1987 |
| JP | 62155451 A2 | 7/1987 |
| JP | 63120786 | 5/1988 |
| JP | 63221032 | 9/1988 |
| JP | 63273682 | 11/1988 |
| JP | 63308080 A2 | 12/1988 |
| JP | 1200937 A2 | 8/1989 |
| JP | 01203825 | 8/1989 |
| JP | 01255526 | 10/1989 |
| JP | 01306238 | 12/1989 |
| JP | 167726 | 6/1990 |
| JP | 03271450 | 12/1991 |
| JP | 03293121 | 12/1991 |
| JP | 04019139 | 1/1992 |
| JP | 04223137 | 8/1992 |
| JP | 04254649 | 9/1992 |
| JP | 4261691 | 9/1992 |
| JP | 04368563 | 12/1992 |
| JP | 05247809 | 9/1993 |
| JP | 05315064 | 11/1993 |
| JP | 05340058 | 12/1993 |

| | | |
|---|---|---|
| JP | 06 001955 A | 1/1994 |
| JP | 06335973 | 12/1994 |
| JP | 07 060896 | 3/1995 |
| JP | 7137140 A2 | 5/1995 |
| JP | 07158395 | 6/1995 |
| JP | 7179828 | 7/1995 |
| JP | 08025833 | 1/1996 |
| JP | 08267697 | 10/1996 |
| JP | 08296282 | 11/1996 |
| JP | 10195544 | 7/1998 |
| JP | 11170272 | 6/1999 |
| JP | 11172325 | 6/1999 |
| JP | 11216729 | 8/1999 |
| JP | 11278134 A2 | 10/1999 |
| JP | 11309723 | 11/1999 |
| JP | 2000310278 | 11/2000 |
| WO | WO 90/10679 | 9/1990 |
| WO | WO 93/09310 | 5/1993 |
| WO | WO 94 08781 A | 4/1994 |
| WO | WO 98/18877 | 5/1998 |
| WO | WO 98 18877 A | 5/1998 |
| WO | WO 00/27941 | 5/2000 |
| WO | WO 01/29142 | 4/2001 |

\* cited by examiner

FASTENING DEVICE

This application is based upon and claims priority from U.S. Provisional Patent Application No. 60/201,078, Malofsky, Malofsky and Mann, filed Apr. 28, 2000.

TECHNICAL FIELD

The disclosed invention relates to an electromagnetically-activateable fastening device which may be used, for example, to fasten decorative materials, such as moldings, laminates and wall coverings, to surfaces, such as wood, concrete, plaster or wallboard. The fastening device disclosed may be used in a wide variety of building applications, including structural applications. The fastening device is heat-activated, for example, by exposure to electromagnetic waves, and possesses improved heating efficiencies which allow activating using hand-held and low-powered induction heating devices. The fastening device of the present invention may be reversible in that it may be removed without significantly damaging the surface to which it was fastened.

BACKGROUND OF THE INVENTION

The building or decorating of homes requires a wide variety of fastening operations in a wide variety of contexts. For example, various moldings and wall coverings need to be fastened onto wall surfaces, such as plaster, wall board or gypsum board. There are a variety of ways currently known to fasten surfaces together which are conventionally used in the building trades. Examples of such commonly used fasteners include nails, screws, staples, and adhesives or glues. Each of these methods has its own set of advantages and drawbacks. For example, while nails, screws and staples are relatively easy to use, they tend to present difficulties in a decorative context since they can mar the surfaces being fastened and detract significantly from the decorative look of the surface being applied. Glues or other adhesives can be messy, difficult to apply to surfaces and tend not to be reversible, as anyone who has ever tried to strip wallpaper from a wall can readily attest. It would be highly desirable, therefore, to have a fastener which is not only strong and easy to use, but which does not significantly mar either of the surfaces being fastened and which, if desired, can be readily reversed allowing the fastened surfaces to be easily separated. That is what the present invention accomplishes.

The use of electromagnetic energy (i.e., induction heating) to activate adhesives is known in the art. However, the art does not teach or suggest a fastening device, activated by electromagnetic energy, which forms a strong bond which may be easily reversed, such as that described in the present application. In fact, most technical development in this area has centered on permanent, high strength adhesive bonding of aerospace or automotive assemblies where very high bond strengths, e.g., greater than 4,000 psi, are required. Bond times are long to accommodate the slow, repeatable, uniform development of bond strengths over long cure times, for example from one minute to several hours to upwards of a day. In contrast, for many construction and other manufacturing applications, the bond strengths do not have to exceed 2,500 psi, or in many cases, 1,000 psi. Furthermore, the bond strengths do not have to be stringently uniform or as tightly repeatable. Finally, and importantly, it is highly desirable that the bond times be very fast, less than one minute, usually less than ten seconds, and frequently even less than two seconds. This is also what the present invention accomplishes.

While microwave heating with hysterectically activateable magnetic particles is a solution in many respects to the above-described problem, microwave heating may be unsafe for use in a human environment and must be used in a highly controlled environment to minimize these safety concerns. The present invention permits such fastening to be carried out both in a controlled manufacturing plant environment and in a much less controlled construction site environment.

The use of thermoplastic welds to join metal surfaces, for example in the aircraft industry, is disclosed in a number of patents. Some of these patents utilize structural susceptors which provide a vehicle for carrying the thermoplastic adhesive resin and for reinforcing the bond formed. The key in these patents is to maximize the contact between the surfaces to be bonded and the adhesive layer thereby forming a bond which is exceptionally strong and not reversible. Another focus of these patents is the elimination of the edge effect when the weld is exposed to electromagnetic energy, in order to obtain uniform heating across the weld thereby forming a bond of uniform strength. See, for example, U.S. Pat. No. 5,717,191, Christensen, et al., issued Feb. 10, 1998; U.S. Pat. No. 5,500,511, Hansen, et al., issued Mar. 19, 1996; U.S. Pat. No. 5,508,496, Hansen, et al., issued Apr. 16, 1996; U.S. Pat. No. 5,705,795, Anderson, et al., issued Jan. 6, 1998; U.S. Pat. No. 5,705,796, Hansen, et al., issued Jan. 6, 1998; U.S. Pat. No. 5,723,849, Matsen, et al., issued Mar. 3, 1998; U.S. Pat. No. 5,756,973, Kirkwood, et al., issued May 26, 1998; U.S. Pat. No. 5,847,375, Matsen, et al., issued Dec. 8, 1998; U.S. Pat. No. 5,916,469, Scoles, et al., issued Jun. 29, 1999; U.S. Pat. No. 5,919,387, Buckley, et al., issued Jul. 6, 1999; and U.S. Pat. No. 5,919,413, Avila, issued Jul. 6, 1999.

Portable hand-held induction tools used for forming thermoplastic welds based on induction heating are also known. See, for example, U.S. Pat. No. 4,017,701, Mittelmann, issued Apr. 12, 1977; U.S. Pat. No. 5,266,764, Fox, et al., issued Nov. 30, 1993; U.S. Pat. No. 5,350,902, Fox, et al., issued Sep. 27, 1994; U.S. Pat. No. 5,374,808, Coultrip, et al., issued Dec. 20, 1994; U.S. Pat. No. 5,374,809, Fox, et al., issued Dec. 20, 1994; U.S. Pat. No. 5,874,713, Cydzik, et al., issued Feb. 23, 1999; and U.S. Pat. No. 5,378,879, Monovoukas, issued Jan. 3, 1995.

Known induction heating devices generally suffer from an inability to be made truly portable, i.e., lightweight, while simultaneously delivering the level of energy necessary to form bonds in short periods of time. Part of the reason that such portable induction heating devices do not exist is that there are no fastening devices which can bond quickly and effectively upon the application of low levels of power. It would, therefore, be very useful to have an adhesive device which utilizes such low levels of energy very efficiently, for example, by accumulating heat in the susceptor and adhesive while simultaneously minimizing conduction losses to the substrate (surface to be bonded) until the adhesive has melted, begun chemical reaction, flowed adequately, or all three. Such a device to be useful should provide bonding strong enough to meet a wide variety of applications. Finally, it would be beneficial if the bonds formed could be reversible. The fastening devices of the present invention can accomplish these objectives.

U.S. Pat. No. 4,038,120, Russell, issued Jul. 26, 1977, describes the use of an energized heating element or wire to heat a hot melt glue resulting in adhesion between contiguously assembled panels. The disclosed method involves heating a glue-coated wire to liquefy the glue, producing a cohesive state and facilitating the assembly of panels. This method is said to be useful for introducing a cohesive material (glue) to an area of limited accessibility (groove). The use of the heating element (wire) requires the direct application of energy (electricity) to provide the heat to melt the glue.

U.S. Pat. No. 3,996,402, Sindt, issued Dec. 7, 1976, relates to the assembly of sheet materials by the use of a fastening device utilizing an apertured sheet of any current-conducting material sandwiched between coatings of hot melt glue. An induction heating system is activated causing eddy current heating in the current-conducting material with consequent melting of the hot melt glue, thus resulting in fusion and bonding of the sheet materials.

U.S. Pat. No. 3,574,031, Heller, et al., issued May 26, 1970, describes a method and material for welding thermoplastic bodies by using a susceptor sealant between the bodies to be joined. The susceptor sealant is characterized by having particles, heatable by induction, dielectric or radiant energy, dispersed in a thermoplastic carrier compatible with the thermoplastic sheets to be welded. The welding of the thermoplastic sheets takes place by exposing the susceptor sealant to heat energy, softening the carrier material and joining all thermoplastic materials.

U.S. Pat. No. 3,612,803, Klaas, issued Oct. 12, 1971, discloses a fastening device which consists of a quantity of heat-activateable adhesive containing a closed electrically-conductive loop and a ferromagnetic material insulated from said closed loop. In operation, the fastening device is activated by a solenoid coil energized with alternating electrical current. The current emitted from the solenoid is transferred to the fastening device where a current of large amperage and low voltage is generated in the loop enveloped by the heat-activateable adhesive. The current produces heat that causes the adhesive to become sticky. The efficiency of the disclosed device is improved by fitting it with a ferromagnetic core enclosed within the closed loop.

U.S. Pat. No. 5,770,296, Remerowski, et al., issued Jun. 23, 1998, describes a fastening device which is useful in facilitating the assembly of associated parts by employing a heat-activated assembly element, such as dowel or a disk or a strip constructed to include a target material, and a solid substance which will exhibit adhesive and expansive properties on exposure to heat. The heat is generated in the target material by exposing the target material to electromagnetic waves. See also, U.S. Pat. No. 5,935,369, Remerowski, et al., issued Aug. 10, 1999; U.S. Pat. No. 5,932,057, Remerowski, et al., issued Aug. 3, 1999; and U.S. Pat. No. 5,938,386, Remerowski, et al., issued Aug. 17, 1999.

SUMMARY OF THE INVENTION

The present invention relates to a fastening device for promoting the assembly and adherence of associated pieces upon exposure to electromagnetic energy, comprising a susceptor sheet, preferably having a thickness of no greater than about 2 mils, and a heat-activateable adhesive on at least one surface of said susceptor. The adhesive is placed on the susceptor such that where a test surface congruent in shape to the susceptor surface is placed on the outward side of the adhesive:
(a) at least about 35% of the area of adhesive in contact with said test surface can have inscribed within it circles having a diameter of about ½" or less (preferably ¼" or less); and, preferably,
(b) from about 0.001% to about 65% of the total area of the test surface is in contact with the adhesive.

In the preferred fastening devices, in addition to the foregoing conditions, if a test surface congruent in shape to the susceptor is placed against the inward side of the adhesive, the following conditions are also met:
(c) at least about 35% of the area of adhesive in contact with said test surface can have inscribed within it circles having a diameter of about ½" or less (preferably ¼" or less); and preferably
(d) from about 0.001% to about 65% of the area of the test surface is in contact with the adhesive.

It is particularly preferred if, for a given device, the contact area represented by conditions (a) and (b) is less than the contact area represented by conditions (c) and (d).

Finally, when reversibility of the bond is important, the following additional condition should also be met:
(e) from about 0.05% to about 65% of the total area of the test surface is in contact with the adhesive as measured by the post-bonding test procedure described herein.

The preferred susceptor is a metal foil and the adhesive may be placed on the susceptor either in a continuous or a discontinuous manner, either randomly or in a pattern, as long as the coverage conditions defined above are met. The first condition is essential to obtaining the required holding strength and speed of binding from the adhesive article (conditions (a) through (d)), while the second condition (condition (e)) is necessary to permit the bond to be reversed without significant adverse effects to the surfaces being bonded.

Preferred susceptors are those activateable by induction heating, most preferred are those activated by frequencies of about 1,000 kHz or less.

Finally, the present invention encompasses a method for bonding surfaces together. In this method, the adhesive portion of the fastening devices described above is placed against the surface (or surfaces) to be bonded and the device is activated to heat the adhesive, such that no more than about 65% of the surface area of each surface to be bonded is in contact with the adhesive after heating. In this method, components of the device can also be placed individually in the appropriate configuration against the surfaces to be bonded, rather than placing them together as a single fastening device.

DETAILED DESCRIPTION OF THE INVENTION

Figure 1:
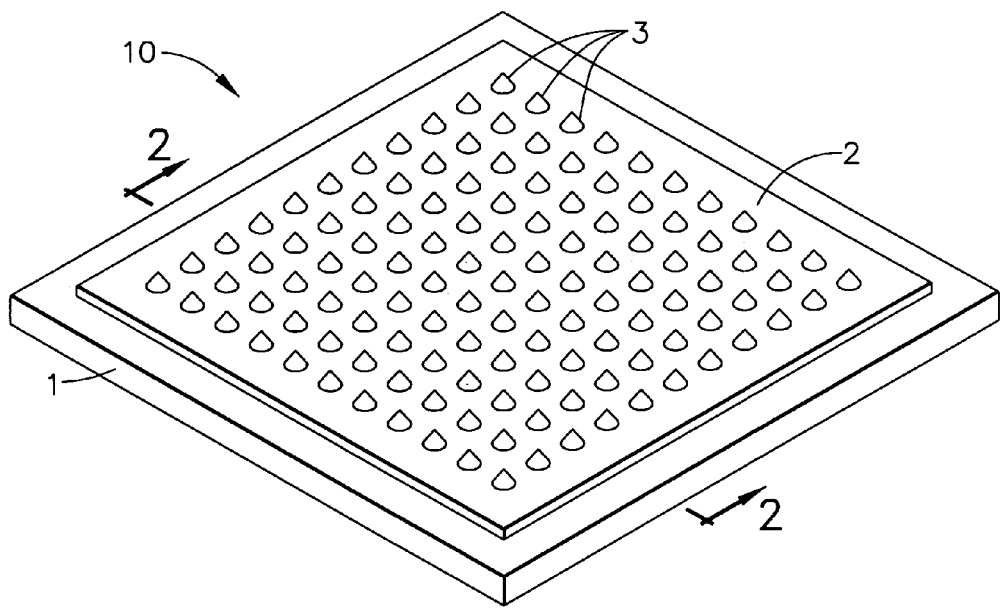
FIG. 1 is a perspective top view of a fastening device of the present invention.

The present invention relates to a fastening device which very effectively, efficiently and quickly fastens materials, such as roll goods or millwork, to a variety of work surfaces. Preferred fastening devices of the present invention form a bond which can be reversed. The basic elements of the fastening device include a susceptor sheet and a heat-activateable adhesive placed on that susceptor sheet in a specifically-defined configuration. The fastening device may also optionally include other components, such as a supplemental structural layer and/or a primer. All of these components will be discussed in detail herein.

The fastening devices of the present invention are particularly useful for fastening roll goods or millwork onto surfaces in the course of the construction process. Roll goods, for example, comprise linoleum, tar paper, interior wall coverings, wood and metal veneers, vinyls (such as Naugahide), polyesters, synthetic fabrics (such as nylon, rayon and the like), plastic laminates, roofing base, intermediate and finished plies. The present invention is particularly useful for fastening materials with linear profiles, such as millwork. Millwork is the term used to describe products which are primarily manufactured from lumber in a planing mill or woodworking plant, such as moldings, door frames and entrances, blinds and shutters, sash and window units, doors, stair work, mantels and porch work. Millwork also includes shelf edge banding, toe boards, trim panels, scribe molding, chair front panels, and bead molding, which serve both a decorative and functional purpose. While adding visual appeal, contrast and style, they also provide a seamless continuity to adjoining parts, provide a wear surface, act as drawer handle pulls or door pulls, and affix upholstery and fabric.

The present invention is particularly useful for attaching moldings onto surfaces such as drywall, gypsum board, plaster, plywood, oriented strand board, or particle board. Moldings are decorative strips of wood or plastic that are designed to perform useful functions as well as visual enhancements to a work surface. For example, window and door casings cover the gap between the jamb and the wall covering, and they also make the installation more rigid. There are numerous types of moldings. For floors, there are base, shoe and quarter-round moldings. For walls, there are chair rails, including cap, casing and stop moldings. For ceiling treatments, there are crown, cove, inside corner, base, casing cap and stop moldings. Other moldings include bed and cove moldings, door and window stops, mullion casings, battens, glass beads, drip caps, apron and stool moldings, and picture and screen moldings. One of the real advantages of the present invention is that it can be effectively used to fasten together painted and other finished surfaces without causing damage (e.g., nail holes) to those surfaces. All of these moldings, as well as other forms of millwork and roll goods, can easily and securely be affixed to a work surface using the fastening device of the present invention. Although the fastening devices of the present invention are particularly useful for home construction, they may also be used in cabinet assembly, automotive assembly, boat assembly, aircraft manufacture, or any other manufacturing or construction-based industries where parts need to be fastened together in a strong and convenient manner.

The fastening device of the present invention is utilized by placing it between the two surfaces to be fastened and then activating the adhesive on the device, for example with electromagnetic waves, to adhesively join the surfaces. Specifically, where roll goods are utilized, the fastening device is placed adjacent to the back surface of the roll goods and the top surface of the work surface to be covered. The fastening device of the present invention may be fashioned such that it actually can be purchased as a part of the roll goods or mill work, for example, attached to the back surface of a wall covering or the back surface of a molding, so that all that needs to be done is to position the covering or molding at the appropriate point on the work surface and activate the adhesive.

The key elements of the fastening device of the present invention include the susceptor sheet and a heat-activateable adhesive placed on the susceptor sheet in a specifically-defined configuration.

The susceptor layer will generally be made from a material which is activateable by induction heating (i.e., one which will generate heat in the presence of alternating current electromagnetic waves), most particularly those which may be activated by a hand-held induction heating tool, for example, materials and configurations which are activateable by frequencies of about 1,000 kHz or less, preferably about 500 kHz or less. The susceptor is in the form of a sheet or tape, particularly a foil, preferably having a thickness of no greater than about 2 mils, more preferably no greater than about 1 mil. Depending on the particular application, it should be appreciated that the preferred thicknesses of the susceptor tape or foil will necessarily vary due to differences in heating efficiency of foils of different thicknesses or compositions. For example, for high-speed bonding with a low-powered, air-cooled tool, susceptors made of 0.25 mil to 0.50 mil aluminum are typical because heat generation is rapid in the thinner susceptor. Similarly, a thicker susceptor, 2 mils or thicker, will be used for slower heating where a relatively long time chemical reaction or adhesion flow mechanism must occur. The susceptor may be present in the form of a continuous sheet (e.g., a foil), but can also comprise a discontinuous sheet such as one made from interconnected particles or interwoven fibers, as long as it is activateable by induction heating (as used herein, "susceptor sheet" is intended to encompass all such embodiments). It is preferred that the susceptor be substantially planar in configuration. Preferred susceptors are made from metallic foils or non-metallic foils, with metallic foils being particularly preferred. Examples of metallic foils include those made from metallic fibrous materials, conductive metal materials and conductive magnetic materials. Preferred metallic materials include steel, iron, aluminum, copper, nickel, tin or amalgams thereof, with aluminum being particularly preferred. A non-metallic material useful in the present invention as the susceptor includes carbon. The surface of a susceptor may be smooth or textured (for example, grooved, cross-hatched, roughened, pitted or stamped). A textured surface frequently can provide better gripping of the adhesive material and, therefore, better holding capacity. It can also provide for discontinuous contact between the susceptor and the adhesive, helping to determine the melt speed of the adhesive. The surface of the susceptor may also be solid or perforated. A perforated susceptor is useful in certain embodiments because it can provide concentrations of heat at specific points and can also allow the fastening device of the present invention to be easily adjusted to the size required for a specific fastening operation. The color of the susceptor can also be varied (e.g., silver or black) to provide particular heating properties to particular areas of the substrate.

The shape or perimeter of the susceptor sheet may have an impact on the ability of the fastening devices of the present invention to effect optimal bonding. For example, a mathematically smooth perimeter (i.e, a simple closed curve without angles) will provide relatively uniform heating along the edges of the susceptor. Departures from a mathematically smooth perimeter, for example the presence of sharp internal angles in the perimeter, can result in spots which become very highly heated during exposure to electromagnetic radiation, while larger external angles can result in points which are not as highly heated. Thus, the outer (edge) shape of the susceptor can be used to bring the greatest heating to specific points where it is most greatly needed. Further, by using the fact that the greatest heating generally takes place at the edges of the susceptor (the so-called "edge effect"), greater heating efficiency can be achieved in the article of the present invention. Thus, for example, if the adhesive is concentrated close to the susceptor edges, it can be heated and melted more quickly, using a lesser amount of energy, because of the edge effect. This is in sharp contrast to the prior art where the edge effect is treated generally as something to be avoided.

The second required component in the present invention is the heat-activateable adhesive which is placed on one or both surfaces (faces) of the susceptor sheet. The addition of heat either melts the adhesive rendering it capable of bonding, or triggers a chemical reaction, such as a cross-linking reaction, causing the adhesive to bond. Such adhesives are well-known in the art, and are disclosed, for example, in Adhesives and Sealants, Engineered Materials Handbook, Volume 3, ASM International, 1990, incorporated herein by reference.

Preferred adhesives include hot melt adhesives, curable adhesives, and mixtures thereof. In general, hot melt adhesives are solid at temperatures below about 60° C. As the temperature increases beyond this point, the material rapidly melts to a fluid which forms a bond after cooling and setting in a solid state. Because hot melt adhesives are thermoplastic, the melting-resolidification process is repeatable with the addition and removal of heat. Examples of the hot melt adhesives include ethylene and vinyl acetate copolymers (EVA), polyvinyl acetates (PVA), polyethylene (PE), amophorus polypropylene block copolymers such as those based on styrene and elastomeric segments or ether and amide segments, polyesters and polyamides, with polyamides, polyolefins and ethylene/vinyl acetate copolymers being particularly preferred. Foamable hot melt adhesives are also particularly preferred for use in the present invention. These materials are intended to encompass adhesives which are prefoamed, as well as those which foam when heat is added to them. In the former, either nitrogen or carbon dioxide is introduced into the hot melt, resulting in a 20% to 70% increase in adhesive volume. The foaming increases hot melt spreading and open time. This method is frequently used with polyethylene hot melt adhesives. Examples of curable adhesives include urethanes, epoxies, acrylics and phenolics, with acrylics and phenolics being particularly preferred because of their fast cure times. The physical and chemical properties of various adhesives are well-known in the art. The particular application for which a fastening device of the present invention is to be used will define the particular adhesive which is optimal for inclusion in that device.

Although the heat-activateable adhesives are a required element of the present invention, other types of adhesives may additionally be included as optional components. For example, areas of pressure-activated adhesives may be included on the susceptor together with the heat-activated adhesives. This embodiment permits the article to be placed at its desired location and held there temporarily by the pressure-sensitive adhesive while the heat-activated adhesive is utilized to provide the more permanent bonding. This would be a significant help to the user of the invention in locating and lining-up the object to be fastened.

A preferred method for fastening an object to a work surface has been developed wherein a certain portion of the surface of an induction-activatable adhesive system is coated with an additional adhesive system that, among its other properties, is pressure-sensitive to an object, the work surface, or both, for most applications, at all temperatures from the coldest storage temperature to which the fastening system can be exposed, to the highest temperature of application of the adhesive system. The method involves placing the adhesive system onto the object, the work surface, or both, in any of several preferred positions, prior to induction activation by electromagnetic means. Without such a method, complex, cumbersome and/or additional clamping or positioning equipment or hand dexterity is required to maintain the object, the adhesive system, and the work surfaces in close, intimate proximity to each other without accidental displacement of any of the elements prior to induction activation and subsequent cooling.

Of particular interest is the adhesive bonding of objects to work surfaces, either permanently or temporarily, where speed, convenience, ease of use, cost, and productivity are critical. Examples are sheet assemblies, as used in packaging, wallpaper hanging, paper crafts, sign hanging, or millwork assembly and attachment. In all of these cases, the degree of tack will vary according to the need of the application. An example of the advantage of this system can be understood by considering the task of placing a "sheet" or film of an adhesive system onto a wall to bond a poster or piece of millwork, and realizing the likelihood of something falling out of place. Bringing two elements together and holding them together is far easier than holding together three items, especially where hand-work is involved.

This preferred innovative method is particularly useful where pre-positioning, prior to bonding, allows changes to be made that can be readily appreciated prior to the permanent, or stronger bond created by the induction process. This is especially true where more than one object is being applied to a work surface, or work surfaces, especially where the objects must be in close proximity, as is the case when one is trimming-out a door or window for a house, a boat, or a car. The assembly of more complex structures, such as windows or doors, can be adapted to this method with the same thoughts in mind.

A pressure-sensitive adhesive employed in these induction adhesive systems can be the only adhesive element employed, or it can be one of several adhesive elements. The pressure-sensitive adhesive component may cover 100% or less of the surface of either the object or the work surface. Where less than 100% of the surface area contacting the substrate, the work surface, or both, is composed of the tacky, pressure-sensitive adhesive component, that component is not required to undergo a change in chemical or physical disposition as long as the other adhesive element or elements flow around it, or contact sufficient surface area, after induction, to provide an adequate bond. Of particular advantage in such systems that develop strong, "permanent"

bonds are systems that are soluble to a significant extent in the other adhesive components without sacrificing bond quality, are displaceable at the interface by the other adhesive components, or have one or more pressure-sensitive components that are reactive and undergo a chemical change that affords a more durable permanent bond. Where 100% of the surface that is in contact with either the substrate, the work surface, or both, is covered by the pressure-sensitive, tacky adhesive component, that component must be reactive, capable of a physical phase change, or be soluble in the other adhesive components, displaceable at the interfaces by the other adhesive components, or have some combination of the latter three properties.

Figure 5:
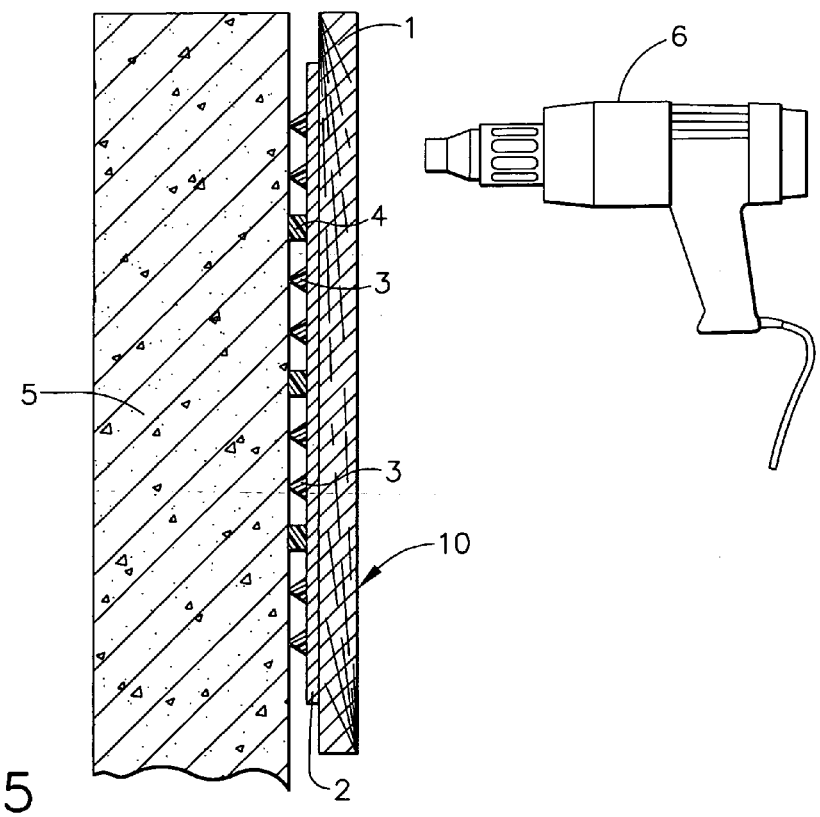
FIG. 5 is a side view illustrating the use of the fastening device of the present invention.

Thus, when dealing with pressure sensitive adhesives in the present invention, there are two major embodiments to be considered:

(1) embodiments where the pressure sensitive adhesive is used together with a separate heat activateable adhesive, such as those structures shown in FIG. 5; and (2) embodiments in which the pressure sensitive adhesive used is the sole adhesive component and is one which converts to an adhesive providing a stronger, more permanent bond upon the application of heat energy. In such embodiments, the addition of electromagnetic energy, particularly in the form of heat, converts the pressure sensitive adhesive to one with increased strength, particularly one which exhibits substantially no creep under conditions of use. Creep is measured using ASTM test method D4680-92. This conversion may take place, for example, by a chemical reaction, a phase change or even a physical change (e.g., a change in crystalline structure or a mixing of physically-separated components). Examples of such adhesives are shown in, for example, U.S. Pat. No. 3,993,815, Douek, et al., issued Nov. 23, 1976; U.S. Pat. No. 4,118,442, Douek, et al., issued Oct. 3, 1978; U.S. Pat. No. 3,996,308, Douek, et al., issued Dec. 7, 1976; U.S. Pat. No. 4,039,705, Douek, et al., issued Aug. 2, 1977; U.S. Pat. No. 4,092,376, Douek, et al., issued May 30, 1978; U.S. Pat. No. 5,596,028, Yanagi, et al., issued Jan. 21, 1997; and U.S. Pat. No. 5,409,764, Otsuki, et al., issued Apr. 25, 1995; all of which are incorporated herein by reference.

One or more optional reinforcing layers can be placed within the adhesive system. The reinforcing materials can be any that provide improved strength to the new susceptor structure while not being substantially electro-magnetically activatable to produce heat. Thermoplastic and thermoset polymer structures are typically utilized, optionally with some kind of reinforcement that is isotropically strong. Isotropically strong materials may also be utilized alone as the form of reinforcement. Examples of such an isotropic reinforcement include continuous or discontinuous fibers, flakes, and the like, typically carbon, glass, olefinic, aramid, boron, nylon, polyester, cellulosic, and the like, or combinations of these. The reinforcement may be in a continuous or discontinuous structure and may be ordered (knit, cast, welded, etc. . . . ) or random (i.e., spun bonded). This reinforcement layer is preferably less than 10 mils, more preferably less than 2 mils, and most preferably less than 1 mil in thickness. Optional insulative materials and/or layers may be added to restrict thermal losses through the reinforcing layer.

The overall adhesive/susceptor-system structures or the individual components may be flat, textured, perforated, or any combination thereof. Either a portion or all of the adhesive/susceptor structure may be reinforced. The reinforcement may vary in strength from one section to another. Changes are meant to facilitate handling and/or the assembly and/or disassembly of objects. The structures may be utilized as particles, chips, flakes, sheets, discs, strips and so on, and stored as rolls, coils, or flat stacks where possible.

Discontinuous or continuous adhesive coatings, and controlled substrate and/or susceptor contact are also be advantageously combined with this invention. The adhesive systems employed may be thermoset, thermoplastic, or a combination of these. The adhesives may be foaming, reversibly polymerizable, have expansion or contraction properties, and so on. The adhesives may be coated, or may contact all or part of the susceptor structure, either before or after bonding. The adhesives and/or the susceptor structure also may be reinforced by fibers, flakes, or other fillers, depending upon the desired physical or chemical effect, either before or after bonding.

Such structures can be utilized either reversibly or irreversibly. These structures are particularly useful improved regarding reversibility since it permits removeability and reuse of expensive materials, such as exotic woods.

The susceptor sheets or sections within the structures themselves can be composed of various metals and alloys or other magnetically activateable materials.

The sheets can either be perforated, textured, or otherwise modified, as well, to achieve a preferred bond, heating profile.

The adhesive utilized in the present invention may be in solid, semi-solid, liquid or viscous liquid form at room temperature. However, solid or semi-solid form adhesives are preferred, with solid form adhesives being particularly preferred, since they are easiest to handle. It is preferred that the adhesives utilized in the present invention soften at a temperature greater than about 60° C., preferably at a temperature greater than about 70° C., and most preferably at a temperature greater than about 80° C.

The pattern in which the adhesive is applied to the face (or faces) of the susceptor sheet constitutes an important part of the present invention. The adhesive may be applied to one or both sides (faces) of the susceptor sheet. This will depend on whether the fastening device of the present invention is to be used to fasten together two surfaces of the consumer's choice or whether the fastening device of the present invention is to come pre-attached to a surface (such as a wall covering or molding) which is then bonded in place by the consumer. The adhesive may be applied to the susceptor sheet in a random manner or in an ordered pattern, as well as in a continuous or a discontinuous manner, as long as the limitations on coverage discussed below are met. Thus, for example, the adhesive may be placed on the susceptor sheet as an "elongated bead" in the form of a web, such as a random web or an ordered web. In either case, this would be an example of a continuous application onto the susceptor. A particularly preferred device of the present invention has the adhesive placed on the susceptor sheet in a random overlapping web (i.e., a random web of overlapping loops). See FIG. 7. The adhesive may also be applied in a discontinuous manner, such as in spots or lines on the susceptor sheet surface. See FIG. 1. These spots or lines may be of any shape, either flat on the sheet, for example, circular, triangular or square, or in three dimensions, for example, spherical, pyramidal, conical, cylindrical, cubic, donuts (tauric) or stars, and may be placed either in a regular pattern across the susceptor sheet surface or randomly across the susceptor sheet surface. The adhesive may be placed on the susceptor sheet using conventional equipment, such as the Nordson Model 3400, commercially available from Nordson Corporation, Norcross, Ga. A preferred embodiment is a continuous web made up of overlapping swirls of adhesive. This adhesive configuration not only provides efficient bonding, but also increases the durability of the susceptor/adhesive article. See FIG. 7.

The adhesive used in the present invention may be prepared in situ. For example, a liquid mixture of monomers, resins and other necessary ingredients can be printed or otherwise transferred or placed onto both or either the substrate and the susceptor. This mixture can then be polymerized, either wholly or partially, either linearly or cross-linked, by, for example, UV, visible light, moisture, or thermally, to very efficiently produce a device of the present invention.

A critical aspect of the placement of the adhesive on the susceptor sheet surface is the amount of coverage by the adhesive of the sheet's surface (and the surface to be bonded) before a bond is formed. If the adhesive covers too much of the susceptor surface relative to the total susceptor surface available, then heat transfer to the surface will be too rapid, and heat accumulation will not occur. Further, if the adhesive covers too much of the surface to be bonded, then heat accumulation will also be compromised and the bond formed will be so strong that it will not be reversible without damaging the surface to which the bond is made. As discussed above, reversibility of the bond is an important preferred element of the present invention. On the other hand, if the coverage of the surface to be bonded is not sufficiently complete, then the bond formed will not be sufficiently strong to last the required amount of time under the forces applied, for example, under the constant pull of gravity. Thus, the amount of contact between the adhesive and the susceptor and the adhesive and the surface to be bonded must be carefully balanced to achieve appropriate heat accumulation (and therefore speed of heating), strength of bonding and, if desired, bond reversibility. In order to meet the requirements of the present invention, adhesive is placed on the susceptor surface such that when a test surface congruent in shape to the susceptor is placed on the outward side of the adhesive (i.e., the side which contacts the surface to be bonded):

(a) at least about 35% (and preferably at least about 50%, more preferably at least about 75%, and most preferably at least about 90%) of the area of adhesive in contact with said test surface can have inscribed within it circles having a diameter of about ½" (preferably about ¼", more preferably about 3/16", still more preferably about ⅛", and most preferably about 3/32") or less (these inscribed circles are generally at least about 0.001" in diameter, and preferably have diameters between about 0.05" and about 0.001"); and preferably (b) from about 0.001% to about 65% (preferably from about 0.001% to about 30%, more preferably from about 0.001% to about 15%, more preferably from about 0.001% to about 5%, most preferably from about 1% to about 5%) of the area of the test surface is in contact with the adhesive ("Pre-Bonding Adhesive Area").

By meeting these criteria, the contact between the adhesive and the surface to be bonded (substrate) is minimized. This results in heat accumulation in the adhesive and, therefore, quicker melting.

The contact between the adhesive and the susceptor may be either continuous or discontinuous. Discontinuous contact between the adhesive and the susceptor is preferred. In fact, it is preferred that if a test surface congruent in shape to the susceptor is placed against the inward side of the adhesive (i.e., the side which contacts with the susceptor), the following conditions are met:

(c) at least about 35% (and preferably at least about 50%, more preferably at least about 75%, and most preferably at least about 90%) of the area of adhesive in contact with said test surface can have inscribed within it circles having a diameter of about ½" (preferably about ¼", more preferably about 3/16", still more preferably about ⅛", and most preferably about 3/32") or less; and preferably (d) from about 0.001% to about 65% (preferably from about 0.001% to about 30%, more preferably from about 0.001% to about 15%, more preferably from about 0.001% to about 5%, most preferably from about 1% to about 5%) of the area of the test surface is in contact with the adhesive ("Pre-Bonding Adhesive Area").

If all four of criteria (a)–(d) are met by a structure, then the efficiency and heat accumulation of the device will be optimized. Of course, a device can be formulated so as to satisfy only one or various subsets of the defined criteria, although the best results will be obtained where all four conditions are met. The heat accumulation within the susceptor and the adhesive can be even further optimized if, for a particular device, the contact area represented by criteria (a) and (b) is less than the contact area represented by criteria (c) and (d). Where the surface contact area with the susceptor is greater than the contact area with the substrate, heat accumulation will occur within the adhesive. This provides for more effective and efficient flow, wetting and/or reaction dynamics as compared to losing the heat to the substrate prematurely.

Finally, when reversibility of the bond is important, it is preferred that the following condition is also met:

(e) from about 0.05% to about 65% (preferably from about 1% to about 35%, most preferably from about 5% to about 25%) of the area of the test surface is in contact with the adhesive, as measured by the test procedure ("Post-Bonding Adhered Area") described below.

Conditions (a) and (c) are important because they require that before bonding, the adhesive be spread out over the surface of the susceptor and that there not be large contiguous areas, within the areas covered by adhesive, which are completely covered by adhesive. Such large areas not only lead to ineffectively long bonding times, but also lead to premature or excessive heat loss to the substrate and/or substrate damage. Conditions (b) and (d) are important because the extent of contact between the susceptor, the adhesive and the substrate will help govern the extent of heat flow between them. Condition (e), which defines conditions after bonding, not only helps assure that the bond is reversible, but it also helps assure effective heat transfer in the fastening device. Clearly, too little adhesive-covered area results in a very weak bond, while too much adhesive-covered area results in a bond which is not reversible. Thus, the conditions described above, defining the total amount of adhesive utilized and the manner in which that adhesive is distributed across the susceptor sheet surface and the surface to be bonded, are critical if it is desired to achieve a bond which is both strong and reversible using the fastening devices of the present invention. If the adhesive is applied to both sides of the susceptor, then these conditions may govern each side of the susceptor (or only one side of the susceptor).

The test surface utilized in the above criteria is congruent in shape with the susceptor sheet surface, such that (in the absence of adhesive), if the test surface was laid on top of the susceptor sheet, the two surfaces would touch at substantially all points (i.e., at least about 80%, preferably at least about 95%, of the surface area of the surfaces will be in contact with each other). Generally, the susceptor and, therefore, the test surface will be substantially flat (i.e., substantially planar), but that will not necessarily always be the case.

The test procedure ("Post-Bonding Adhered Area (PBAA) Test) used to measure condition (e) is as follows:

The adhesive side of a fastening device is placed under a glass plate which is generally congruent in shape to the device (generally, this will mean substantially flat). A weight is placed on the glass plate to produce a force of about 5 psi (based on the area of adhesive coverage). The device and plate are then placed in a forced air oven at a temperature 10° C. above the melting point of the particular adhesive being used for a time sufficient to allow melting and flow of the adhesive (usually not more than about 5 minutes). The device and plate are then removed from the oven and allowed to cool to air temperature. The area of the test surface in contact with the adhesive is then measured.

Three dimensionally (i.e., height-wise), the adhesives placed on the susceptor sheet may have a variety of configurations. Thus, adhesive may be placed on the susceptor sheet such that it is flat or relatively flat in terms of its height. However, it may also be placed such that it has height and the shape of the adhesive along the axis of its height may have an effect both on the bond formed and the speed with which the adhesive heats up and melts. Thus, for example, if the spots of adhesive placed on the susceptor sheet are pyramidal in form (i.e., each having a relatively large square base on the susceptor sheet, tapering to a point at its apex) or conical in form (i.e., a relatively large round base tapering to a point at its apex), those sheets may provide for very efficient heat transfer from the susceptor to the adhesive and, therefore, may be activated using a smaller amount of applied energy than if the apex of the adhesive spot had a larger surface area. Further, since the article of the present invention contacts the surface to be bonded at the small apexes, rather than the larger bases, the area of contact is smaller. Thus, for efficient operation it is preferred that the pre-bonding area of contact between the adhesive and the substrate to be bonded be relatively small (see condition (b)), while the post-bonding area of contact may be somewhat larger (see condition (e)). While the lower limit of conditions (b) and (d) is "about 0.001%", since contact between adhesive and surface to be bonded may be effected through point contacts (e.g., the apex of a pyramid of adhesive) contact areas even smaller than this lower limit may be operable and are intended to be encompassed herein.

Figure 9:
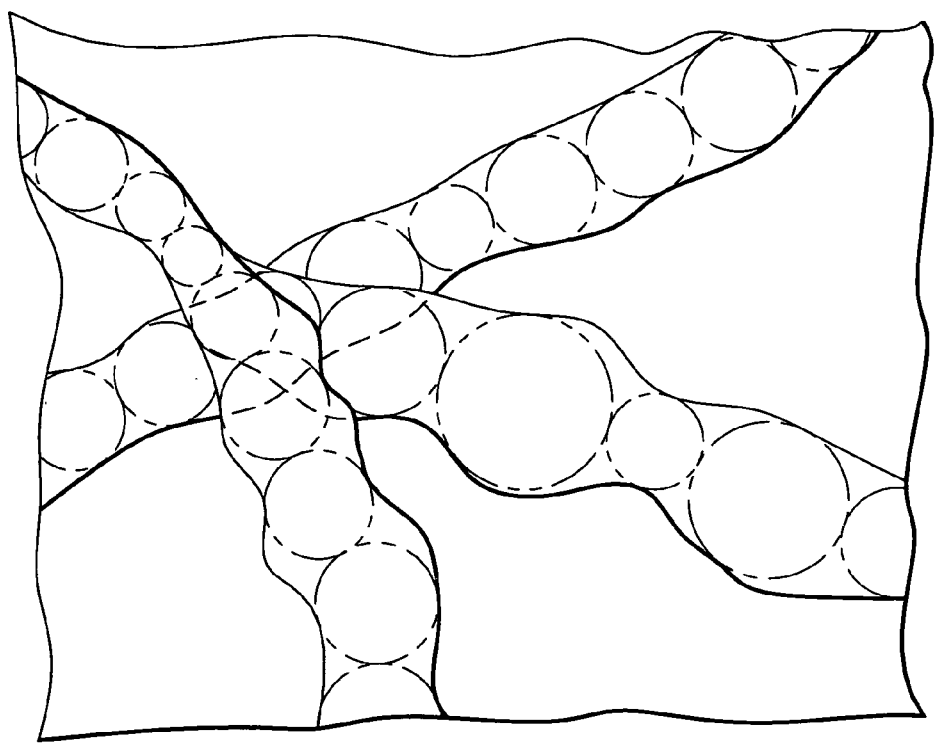
FIG. 9 is an enlarged perspective top view of the present invention illustrating how the adhesive configuration on the product is defined.

An example of how condition (a) is applied is shown in FIG. 9. That figure shows a close-up view of an area of adhesive (outward side) on the susceptor which contacts the test surface. Also shown are circles inscribed within the area of adhesive contact. In order to satisfy condition (a), at least about 35% of that adhesive area of contact must be able to have inscribed within it circles having a diameter of no greater than about ½". As used herein, "inscribed" has its usual mathematical definition, i.e., the circle is drawn within the adhesive area such that it is tangent to both the top and bottom edges of that area.

A number of optional components may be included in the fastening devices of the present invention. For example, a precoat, a coupling agent, and/or a primer may be applied between the susceptor sheet and the adhesive or between the substrate (discussed below) and the susceptor sheet. These treatments, be they physical (e.g., surface treatment) or chemical (e.g., precoats, primers or coupling agents), act to enhance the strength of bonding between adjacent layers of the fastening device. Such primers (for example, silanes) are well-known in the art (see, for example, Adhesives and Sealants, Engineered Materials Handbook, Volume 3, ASM International, 1990, pages 254–258, incorporated herein by reference) and are used to prepare the surface to be bonded and to enhance the bonding between the substrate and susceptor sheet or the susceptor sheet and adhesive layer. A primer is a coating applied to a surface, prior to application of an adhesive, to improve the performance of the bond (see ASTM D907). The coating can be a low viscosity fluid that is typically a 10% solution of the adhesive in an organic solvent, which can wet out the adhered surface to leave a coating over which the adhesive can readily flow.

In addition, the fastening devices of the present invention may include a supplemental (structural) layer between the susceptor and the adhesive, on the side of the susceptor opposite the adhesive, or both. The supplemental layer can have a thickness of up to about 10 mils (preferably no greater than about 5 mils, more preferably no greater than about 1 mil, more preferably no greater than about 0.5 mil, and most preferably no greater than about 0.1 mil and can serve a number of functional purposes. For example, the supplemental layer can be comprised of insulation (e.g., glass batt—to direct heat transfer), foams (thermoplastic, thermoset, open cell or closed cell—to direct heat transfer), scrim (to provide structural integrity to the fastening device of the present invention, as well as to the bond formed), a continuous layer of adhesive, a thermoplastic material, a paper material, a fiber material (in a regular or random pattern), and mixtures of those materials. The supplemental layer may be continuous or discontinuous and is fastened to the susceptor by conventional means, such as spraying, roll coating, dip coating, melt application, laminating or printing. When a supplemental layer is utilized, the adhesive will generally be placed on its upper surface (i.e., the face which is opposite that bonded to the susceptor), and all conditions regarding distribution of the adhesives, described above with regard to placement on the susceptor surface, apply.

One of the key considerations in formulating and constructing the fastening devices of the present invention is getting efficient heat transfer to the adhesive layer (i.e., the heat transfer to the adhesive is maximized while the heat transfer to the surface to be bonded is minimized).

It is important to note the general process for heat transfer within the devices of the present invention. Generally, under the influence of a magnetic field, an electric eddy current is set up in the foil or continuously contacted flake or wire susceptor. Resistance to this current generates heat, with hot spots locally generated where currents are compressed by susceptor geometry. If an object is in intimate contact with the susceptor, heat transfer can occur. If the rate of heat transfer within the foil itself is greater than that by conduction to the object or by convection or radiation to the surrounding atmosphere or separated objects, heat flow within the susceptor will occur more rapidly than heat flow to the surroundings. This is a critical part of the present invention. In fact, without thermal transfer efficiency additives, heat transfer within aluminum is 3–5 times that within most organic plastics and resins. By limiting overall contact of the total system with the substrates, heat can be effectively "stored" in the system for small bursts of time. This stored energy can then transfer to those parts of the system in contact with the substrate only after most of the adhesive has already been melted, reacted, or softened with lower amounts of total delivered power. Furthermore, by limiting total delivered power and substrate contact, more even heating is optionally achieved without complex perforation patterns or other susceptor treatments or preparations that are expensive, complex, and difficult to handle or prepare. Within the total system, by limiting contact with the susceptor, heat flow within the susceptor itself is made more efficient and effective, thus again providing for more even heating at lower total delivered power, particularly where adhesive is placed near naturally occurring hot spots. At these hot spots, heat transfer to the adhesive and to other portions of the susceptor are maximized. With total adhesive coverage, while there is significant overall improvement by limiting substrate contact, further heating efficiencies may be achieved by limiting susceptor contact, particularly to hot spots, because the hot spots will bond without overheating without having areas of adhesive which never melt, soften, and/or react at all. Each system is unique, and individual system performance optimization must occur on a case-by-case basis. This, for example, can be done by limiting thermal transfer to one or both sides of the susceptor, and to contact on either of the two sides being optimized with respect to susceptor and/or substrate contact.

Where thermal transfer to a substrate is of concern because other elements within that substrate may be damaged or may greatly inhibit heat efficient heat transfer, a thermally insulative layer may be placed between the substrate and the system. In all likelihood, this insulative layer will be attached by some other adhesive and mechanical means not meant for activation by this invention. The insulative layer could be a thin plastic sheet, a layer of foam, a plastic sheet filled with gas filled spheres, and so on. Typically, heat transfer to the insulative layer should, by definition, be lower than within the invention's adhesive system. For example, where the foil susceptor may be pre-attached to a piece of trim, a piece of thermally insulative scrim may be laminated to the foil with or without an adhesive and then the scrim-coated sided would be adhesively bonded to the trim, for example with a moisture cured urethane or a water-based urethane emulsion. The thermally activateable system would then be placed on the exposed side of the foil. Alternatively, the insulative layer may be pre-applied, and then itself act as the substrate to be bonded to.

The susceptor sheet may also be placed on a substrate. This substrate may be the backside of one of the surfaces to be bonded. For example, the substrate can be a molding, a wall covering, or wallboard. When formulating this embodiment, the susceptor is fastened to the substrate by conventional means, such as spraying, roll coating, dip coating, melt application, laminating or printing. When the present invention is formulated in this manner, to use the invention all that is required is that the surface to be bonded be placed at its desired location and that heat, preferably electromagnetic energy, be applied to activate the adhesive. Typically, some degree of pressure (from light hand pressure to thousands of pounds) will be applied at some point during the bonding process to insure adequate adhesive wetting. The amount of pressure applied will vary from case to case, depending on the performance and reversibility desired.

Clearly, the adhesives bonding the parts of the fastening device of the present invention together must have different bonding/melting characteristics than the adhesive bonding the device to the surface. Specifically, it is important (e.g., through control of chemistry or thermal resistance) that those auxiliary adhesives do not soften and come apart when the main adhesive is activated by induction heating.

In one embodiment, the present invention is manufactured as a nestable tape. For example, the fastening device is made as a strip of reinforced susceptor having adhesive on both sides (or a long substrate tape having susceptors and adhesive on both sides). If this tape is folded accordion style or rolled up, a large number of these tapes can be nested together for sale or convenient storage.

When desirably situated at the appropriate point for bonding, the fastening device of the present invention is ready to be exposed to electromagnetic waves, produced by and emanating from a generator powered by a source of alternating current. The generator can be held in a fixed position for assembly line production or designed to be hand-held and manipulated so as to quickly and easily pass over, around or near the strategically hidden device while emitting electromagnetic waves which will penetrate the transparent associated pieces, be absorbed by the susceptor sheet, be converted to heat energy, activate the adhesive material and bond together the associated pieces. The frequencies of the electromagnetic waves can range from about 1 kHz to about 1,000 kHz, preferably about 500 kHz or less, with from about 50 kHz to about 300 kHz, being particularly preferred.

To elaborate, heat is produced in the susceptor sheet by two mechanisms: eddy current resistive heating and magnetic hysteresis. Eddy current resistive heating applies to all susceptor materials and is produced in the susceptor by the electromagnetic waves emanating from the generator. The heat resulting from magnetic hysteresis is observed only in magnetic materials. As the electromagnetic field produced by the generator reverses polarity, the magnetized atoms or molecules in the susceptor also reverse. There is an energy loss in this reversal which is analogous to friction: this energy loss is magnetic hysteresis. The lost energy is quickly converted to heat and conducted by the susceptor to the contiguous and heat-activateable adhesive material to initiate adhesion. When heated to the necessary temperature, the adhesive material will liquefy or become heat-activated, attach itself to the adjacent associated parts and, on cooling, create an adhesive relationship between the associated parts. Electromagnetic wave generators for use in induction heating are well-known in the art and, for example, are disclosed in U.S. Pat. No. 4,017,701, Mittelmann, issued Apr. 12, 1977; U.S. Pat. No. 5,266,764, Fox, et al., issued Nov. 30, 1993; and U.S. Pat. No. 5,374,808, Coultrip, et al., issued Dec. 20, 1994, all of which are incorporated by reference. A preferred device is disclosed in U.S. Provisional Patent Application No. 60/163,301, Riess, filed Nov. 3, 1999.

Figure 2:
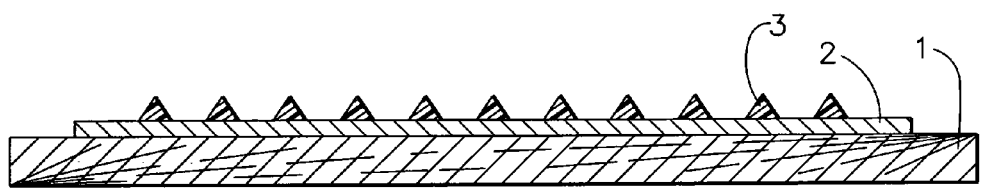
FIG. 2 is a cross-sectional view of the fastening device illustrated in FIG. 1.
Figure 3:
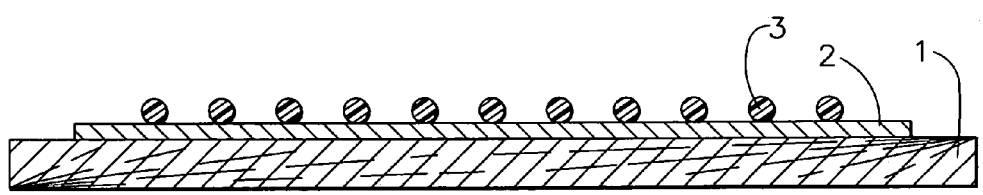
FIG. 3 is an alternative embodiment, shown in cross-section, of the fastening device illustrated in FIG. 1.
Figure 4:
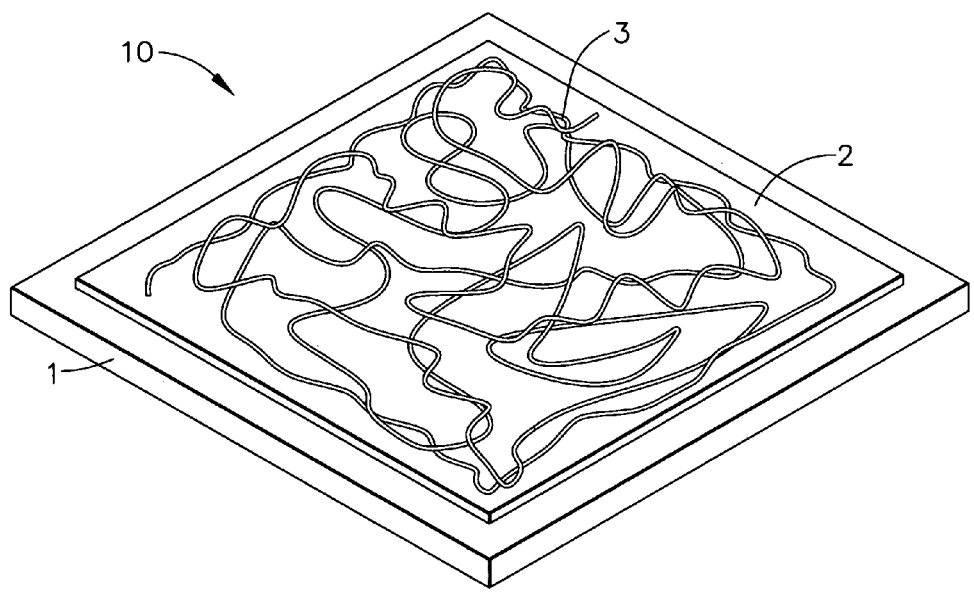
FIG. 4 is a perspective top view of another embodiment of the fastening device of the present invention.

Key elements of the present invention are exemplified in the figures accompanying this application. These figures are merely exemplary and are not intended to be limiting of the present invention. In FIG. 1, 10 denotes an example of the fastening device of the present invention. This example comprises a substrate (1), for example a piece of wallpaper or molding, which (on its reverse side) has fastened to it a susceptor sheet (2) which carries on its surface a heat-activateable adhesive (3) which is arranged on the susceptor sheet in a regular pattern. The adhesive is arranged on the susceptor such that it satisfies the distribution criteria described above. In this case, the susceptor is aluminum foil having a thickness of 1 mil and the adhesive is a polyamide. FIG. 2 shows a side cross-sectional view of the device shown in FIG. 1, taken along the indicated line. In this figure, it is seen that the individual spots of adhesive (3), while having a square base, are pyramidal in shape, coming to a point at their apex. This embodiment provides for very efficient and effective heating because of the very small cross-sectional area found at the top of each adhesive spot. FIG. 3 shows another embodiment of the present invention, in cross-section, essentially identical to that shown in FIG. 1, except that the adhesive spots (3) are spherical, rather than pyramidal. FIG. 4 shows another embodiment of the present invention (10) which is very similar to the one shown in FIG. 1 except that, rather than having the adhesive (3) arranged in a regular (discontinuous) pattern across susceptor sheet (2), the adhesive (3) is arranged in a (continuous) random overlapping web. This configuration not only provides for efficient bonding, but it also reinforces the susceptor. The adhesive in both FIGS. 1 and 4 is arranged such that it meets the requirements defined in the present application for adhesive distribution across the susceptor sheet.

FIG. 5 illustrates the actual use of the fastening devices of the present invention (10). In this illustration, 5 denotes a wall on which a piece of molding is to be fastened; 1 denotes the substrate portion of the present invention which, in this case, is a piece of molding. Adhered to this molding is the susceptor sheet (2) and, on the surface of the susceptor sheet, are two types of adhesives: a heat-activateable adhesive (3), denoted by the triangular shapes, and a pressure-sensitive adhesive (4), denoted by the square shapes. In the operation of this embodiment, the molding is located on the wall at the point at which it is to be fastened. It is temporarily held in place by the pressure-sensitive adhesive by pushing onto the wall. This temporary placement can be adjusted, if desired. A hand-held electromagnetic generator (6) is then used to activate the fastening device of the present invention and thereby fasten the molding onto the wall at its desired location. If it is desired, at any point, to remove this molding from the wall, all that needs to be done is to, once again, apply the electromagnetic energy to the device of the present invention, thereby softening the adhesive and gently pry the molding away from the wall. In this way, the molding can be removed without damaging the surface of the wall. This is in stark contrast to the electromagnetic "welding" which is known in the prior art. These prior art processes are frequently used in the aircraft industry where reversibility of the bond is something to be avoided at all costs. In these prior art processes, in sharp contrast to the present invention, it is critical to get full contact between both surfaces to be bonded and the adhesive doing the bonding, and to form a bond which is not reversible.

Figure 8:
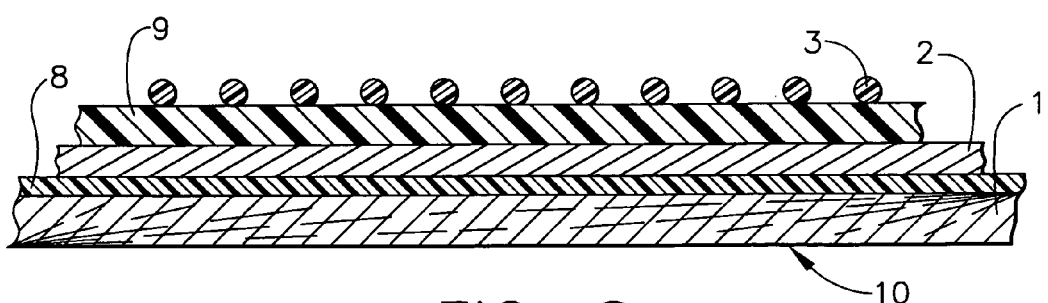
FIG. 8 is a cross-sectional side view of another embodiment of the fastening device of the present invention.

FIG. 8 exemplifies another preferred embodiment of the fastening devices of the present invention (10). In this embodiment, the substrate consists of a wood molding (1) which is to be adhered to a wall. The back surface of the molding is covered with a layer of primer (8) to which is glued the susceptor sheet (2). On top of the susceptor sheet is a supplementary layer (9) which in this case is a polymeric scrim which adds strength to the bond formed. Finally, the surface of supplemental layer carries the heat-activated adhesive (3) in the form of spherical dots across the surface.

In its method aspect, the present invention relates to a method for bonding surfaces together comprising placing the adhesive portion of one of the fastening devices described above against the surface to be bonded and heating the device to activate the adhesive. The surfaces being bonded together may include, for example, plaster, gypsum board, batten, plywood, fabric, wall coverings, vinyl and other polymeric materials, paper, and natural materials, such as wood and grass. In carrying out this method, it is important that no more than about 65%, preferably no more than about 35%, and most preferably no more than about 10%, of the surface area of the surface to be bonded is in contact with the adhesive after the heating and bonding operation is completed. This is particularly important in order to maintain the reversibility of the bonds formed. The heating is preferably carried out by induction heating, preferably when using a hand-held apparatus, at a frequency of about 1,000 kHz or less, and more preferably at a frequency of about 500 kHz or less. Although this induction heating can be carried out in a manufacturing operation using an assembly line and appropriate machinery to create the electromagnetic energy, it is also usefully handled using a hand-held tool which provides the electromagnetic energy.

It is not necessary to obtain uniform heating in order to achieve optimal bonding using the present invention. In fact, there are advantages to formulating fastening devices of the present invention such that they include hot spots, for example, near the edges of the fastening device, in order to enable melting of the adhesive more quickly and with the application of less electromagnetic energy. This is not only more energy efficient, but also provides for faster bonding. Thus, it is useful to include higher concentrations of adhesive near to those hot spots, such as near the edges of the susceptor. This configuration is better suited to a quick bonding operation using a hand-held induction heating tool. This is in stark contrast to the prior art use of magnetic "welding", which goes to great lengths to eliminate hot spots and make sure that the heating of the adhesive is uniform throughout.

As discussed above, the fastening devices of the present invention, as used in the method and devices described above, have adhesive on either one or both sides of the susceptor. When the susceptor carries adhesive on both sides, the device is placed between the surfaces to be bonded and is heated. The surfaces which may be bonded together using the method of the present invention include, for example, wood, plaster, gypsum board, plywood, batten, fabric, wall coverings, vinyl and other polymeric materials, paper, and combinations thereof.

It is important to note that the fastening device of the present invention may be made available to the user completely disassembled, partially assembled or completely assembled prior to the bonding process. For example, foil may be prelaminated to a strip of material, but the adhesive layer is added immediately before activation. Thus, the adhesive may or may not be integrally connected to one or both sides of the susceptor or substrate prior to use. Alternatively, the adhesive layer may be preapplied to the surface to be bonded and the susceptor and other surface to be bonded are added just prior to bonding. A further example would be where two webs of spun bonded adhesive are assembled with foil in-line, but are not bonded to each other beyond mere physical contact. In yet another example, adhesive particles may be sprinkled onto a substrate, with foil preattached to another substrate; the two are brought together in any manner prior to activation. The assembly, held together by pressure and/or aligning implements, can then be activated. The actual embodiment of the device used for a particular application will be highly dependent on the requirement of that application, with specific attention being paid to product requirements, assembly requirements, sales, technology use and distribution.

The following examples illustrate various aspects of the present invention but are not intended to be limiting thereof.

EXAMPLE 1

Figure 6:
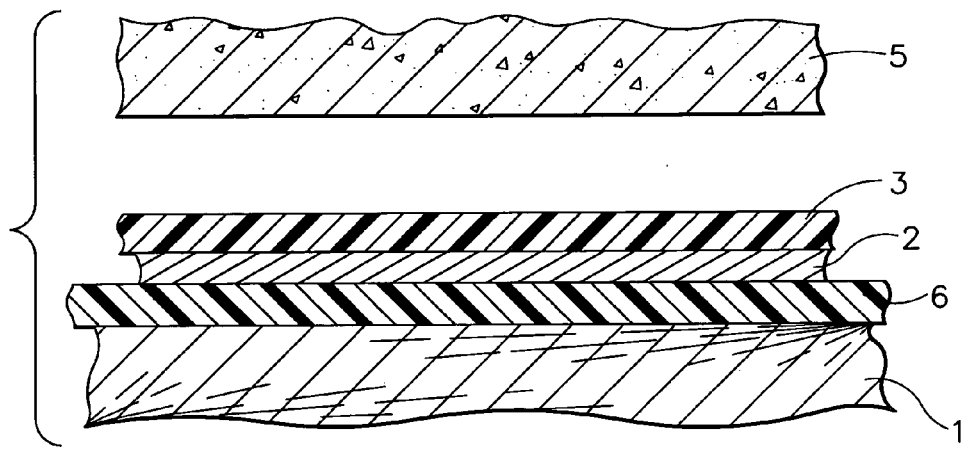
FIG. 6 is a side view of the embodiment described in Example 1.

Bonding a substrate to a target substrate with a pre-attached adhesive system discontinuous to the susceptor and the target substrate (see FIG. 6).

Take a substrate (1), and attach the susceptor (2) with a liquid or semi-solid adhesive system (6) employing either a brush, roller, or other equipment to sufficiently spread the adhesive, reactive or unreactive, immediately or latently, and allow the volatiles, if any, to evaporate until the adhesive reaches a tacky state.

Examples of such processes include, but are not limited to, extrusion coating, knife over roll coating, and airless spray coating. Recognized process equipment manufacturers for this type of coating are represented by Nordson Corporation, May Coatings and Rototherm.

It is possible that one side could be a continuous or discontinuous susceptor contact pressure sensitive adhesive that for the purposes of the bonding method is not adversely affected by the heating during the fastening process. Under those conditions, the susceptor may be pre-coated with a pressure sensitive adhesive on one side and then be pre-applied by a hand-held or automated roller or unwinding system with or without pressure. A heat-curable component or element could then be incorporated chemically or by formulation to convert the pressure sensitive adhesive during the bonding process. Insulating agents may be optionally added to this continuous layer to eliminate thermal losses without impairing desired ultimate strength in tension, shear, or peel under specific environmental conditions. Examples of insulating agents include, but are not limited to, air, nitrogen, argon, other gases, and micro-balloons. Fillers and/or reinforcing agents may also be added.

Either before, after, or during this phase, the susceptor may be itself textured. The susceptor may also optionally contain holes or perforations to facilitate adhesive flow through the susceptor or to facilitate adhesive system separation, as with a postage stamp. The susceptor may also have its outer edges follow a geometric pattern, particularly mathematically smooth ones that facilitate edge heating without localized run-away heating. The susceptor may also have on one or both sides a reinforcing layer composed of a thin (less than 5 mils) plastic or reinforced plastic to facilitate susceptor handling and tear resistance.

Either after the susceptor is affixed or during susceptor manufacture or processing, a primer, such as a silane, to alter adhesion may be optionally coated onto either or both sides of the susceptor, continuously or discontinuously. Furthermore, an aluminum surface pretreatment, including, but not limited to, anodization, plasma treatment, or acid etching may also be optionally conducted on either or both sides of the susceptor, continuously or discontinuously.

Figure 7:
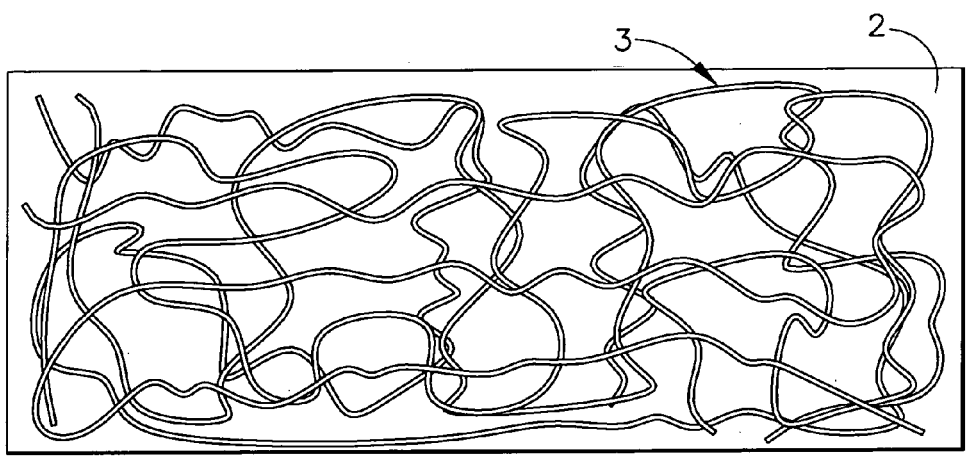
FIG. 7 is a top view of a random web adhesive pattern in that embodiment.

Once the susceptor is suitably affixed to the trim or molding, the discontinuous adhesive layer (3) is applied as per the definition in this application in the form of dots, lines, or a complex network of lines. For wooden trim, a polyester or polyamide adhesive may be used. The adhesive pattern may be ordered, random, or a combination of both. It should be noted that in many cases where bond speed is critical (less than 0.5 seconds), adhesive placement may be biased to the edges of the susceptor, where heat will build up most rapidly. Curable adhesives, particularly latent or heat activateable ones, may be used where environmental durability or creep resistance is important. Fillers and/or reinforcing agents may also be added to achieve a desired performance effect. A supplemental adhesive may be over-applied or simultaneously applied to provide additional properties useful during a fastening process. For example, a supplemental pressure sensitive adhesive layer of low to high tack discretely applied, coated, sprayed or printed can support at low overall bond strength the positioning of the trim for measurement or application prior to bonding. The discontinuous adhesive layer is produced utilizing any number of the various commercially available coating, spraying, printing and/or laminating processes. Again, examples of such processes are extrusion coating, knife over roll coating, airless spray, gravure printing and hot melt gravure printing. A continuous pattern adhesive can be applied via any standard coating technique such as rolling, spray, film lamination, and aqueous emulsion. Representative process equipment manufacturers for this type of coating include Nordson Corporation, May Coatings or Rototherm. Some of these processes may leave a very thin residual layer of adhesive over the entire susceptor surface, as fits the definition of a supplemental layer. For highly pattern specific technologies, one skilled in the art will be able to utilize many of the advancements in nozzle and micro-nozzle technologies for liquids and hot melt adhesives. This allows for exacting control over the amounts and location of adhesive deposited on the substrate. These technologies enable controlled deposition for discontinuous adhesive patterns, webs, sprays, dots and swirl patterns. Several of Nordson Corporation's processes, such as Select Coat™, Control Coat™ or Porous Coat™, are examples of highly controlled discontinuous coating techniques. Lamination can be utilized for spun or extruded adhesive webs, such as Bostik's Sharnet adhesives. This is an example of a three dimensional web where contact on one or both sides (susceptor, substrate) of the individual adhesive layer is minimized, but the overall surface area shadowed by the adhesive layer may border on 100%. Muliple layers of discontinuous adhesive that may be spun bonded are illustrated in FIG. 7.

The attachment and/or bonding adhesive materials can optionally be foamed during or after the manufacturing process, depending upon the specific application requirements. Adhesives that foam during bonding are meant to fill gaps. When prefoamed, the foam adhesives can be in a continuous layer. In this case, the continuous layer in contact with the susceptor is considered the supplemental layer. Foaming may occur by the use of chemical blowing agents, as well as the use of dissolving inert gases in the adhesive (e.g., Nordson Foam Melt System). The specific requirements might be viscosity during or after processing, mechanical properties of the adhesive, gap filling specifications and/or environmental performance needs. When employed for structural applications, foaming should generally produce a foam density of no more than 65% of the density of the base unblown adhesive in order to maintain major performance characteristics, such as strength. It is further possible to bias the foaming to those portions of the target substrate adhesive layer that are actually in contact with either the susceptor and/or the substrate.

The specific components used in making the described fastening devices are as follows:

| Example 1A-Interior Wood Moldings | |
|---|---|
| Substrate: | Wood |
| Target Substrate: | Paper or Acrylic Emulsion Coated Drywall |
| Attachment Adhesive: | Water-Based Emulsion Laminating Adhesive, 40% Solids |
| Susceptor: | 0.50 mil aluminum foil |
| Bonding Adhesive: | Polyamide, 190° C. Melt Point |
| Bonding Adhesive Form: | Three dimensional overlapping ¾" diameter circular swirl, ⅟₁₆" wide bead |
| The following elements may be optionally included in the above example: | |

| | |
|---|---|
| Susceptor Pretreatment: | Anodized Aluminum Surface, both sides |
| Primer Layer: | Silane Coupling Agent Pretreatment, both sides |
| Supplemental Bonding Adhesive: | Acrylic Pressure Sensitive, Medium Tack, 10° C. to 35° C. |
| Supp. Bonding Adhesive Form: | Three dimensional overlapping ¾" by 2" oval swirl, 1/32" wide bead |

Example 1B-Vinyl Wrapped or Vinyl-Based Moldings

| | |
|---|---|
| Substrate: | Plasticized Vinyl |
| Target Substrate: | Vinyl Coated Drywall |
| Attachment Adhesive: | Water-Based Emulsion Laminating Adhesive, 40% Solids |
| Susceptor: | 0.50 mil aluminum foil |
| Bonding Adhesive: | Ethylene Vinyl Acetate, 90° C. Melt Point |
| Bonding Adhesive Form: | Three dimensional overlapping ¾" diameter circular swirl, 1/16" wide bead |

The following elements may be optionally included in the above example:

| | |
|---|---|
| Susceptor Pretreatment: | Anodized Aluminum Surface, both sides |
| Primer Layer: | Silane Coupling Agent Pretreatment, both sides |
| Supplemental Bonding Adhesive: | Acrylic Pressure Sensitive, Light Tack, 10° C. to 35° C. |
| Supp. Bonding Adhesive Form: | Three dimensional overlapping ¾" by 2" oval swirl, 1/32" wide bead |

Example 1C-Wood Cabinetry Trim and Facings

| | |
|---|---|
| Substrate: | Wood |
| Target Substrate: | Wood |
| Attachment Adhesive: | Water-Based Emulsion Laminating Adhesive, 40% Solids |
| Susceptor: | 0.50 mil aluminum foil |
| Bonding Adhesive: | Polyamide, 150° C. Melt Point |
| Bonding Adhesive Form: | 1/16" average width dots or geometric shapes gravure printed to 2–3 mil average height in a diamond array where each dot or shape has an average of ⅛" between them in any direction. |

The following elements may be optionally included in the above example:

| | |
|---|---|
| Susceptor Pretreatment: | Anodized Aluminum Surface, both sides |
| Primer Layer: | Silane Coupling Agent Pretreatment, both sides |
| Supplemental Bonding Adhesive: | Acrylic Pressure Sensitive, Medium Tack 10° C. to 35° C. |
| Supp. Bonding Adhesive Form: | 1/16" average width dots or geometric shapes gravure printed to 2–3.5 mil average height in a diamond array where each dot or shape has an average of ⅛" between them in any direction. Patterns printed such that supplemental adhesive dots replace 15% of the bonding adhesive dots. |

Example 1D-Exterior Wood Trim

| | |
|---|---|
| Substrate: | Wood |
| Target Substrate: | Wood |
| Attachment Adhesive: | Moisture Cured Urethane, 90° C. Melt Point |
| Susceptor: | 0.50 mil aluminum foil |
| Bonding Adhesive A: | Polyamide, 190° C. Melt Point |
| Bonding Adhesive A Form: | Three dimensional overlapping ¾" by 1.25" oval swirl, 1/32" wide bead |
| Bonding Adhesive B: | Moisture Curable Blocked Urethane Adhesive, 80° C. Melt Point, 100° C. De-blocking Temperature. Encapsulated organic liquid as an Internal Foaming Agent. |
| Bonding Adhesive B Form: | Three dimensional overlapping ¾" by 1.25" oval swirl, 1/32" wide bead |

The following elements may be optionally included in the above example:

| | |
|---|---|
| Susceptor Pretreatment: | Anodized Aluminum Surface, both sides |
| Primer Layer: | Silane Coupling Agent Pretreatment, both sides |
| Supplemental Bonding Adhesive: | Acrylic Pressure Sensitive, Medium Tack, 10° C. to 35° C. |
| Supp. Bonding Adhesive Form: | Three dimensional overlapping ¾" by 2" oval swirl, 1/32" wide bead |

Example 1E-Exterior Wood Trim

| | |
|---|---|
| Substrate: | Wood |
| Target Substrate: | Wood |
| Attachment Adhesive: | Moisture Cured Urethane, 90° C. Melt Point |
| Susceptor: | 0.50 mil aluminum foil |
| Bonding Adhesive A: | Compounded Urethane hot melt adhesive, 190° C. Melt Point |
| Bonding Adhesive A Form: | Three dimensional overlapping ¾" by 1.25" oval swirl, 1/32" wide bead |
| Bonding Adhesive B: | Moisture Curable Blocked Urethane Adhesive, 80° C. Melt Point, 100° C. De-blocking Temperature. Encapsulated organic liquid as an Internal Foaming Agent. |
| Bonding Adhesive B Form: | Three dimensional overlapping ¾" by 1.25" oval swirl, 1/32" wide bead |

The following elements may optionally be included in the above example:

| | |
|---|---|
| Susceptor Pretreatment: | Anodized Aluminum Surface, both sides |
| Primer Layer: | Silane Coupling Agent Pretreatment, both sides |
| Supplemental Bonding Adhesive: | Acrylic Pressure Sensitive, Medium Tack 10° C. to 35° C. |
| Supp. Bonding Adhesive Form: | Three dimensional overlapping ¾" by 2" oval swirl, 1/32" wide bead |

Example 1F-Interior Wood Trim

| | |
|---|---|
| Substrate: | Wood |
| Target Substrate: | Wood |
| Attachment Adhesive: | Moisture Cured Urethane, 90° C. Melt Point |
| Susceptor: | 0.50 mil aluminum foil |
| Bonding Adhesive A: | Spunfab PA 1541 (High Performance Polyamide Activation Temperature 185° F.) |
| Bonding Adhesive A Form: | Web Adhesive (discontinuous spun adhesive) |

The following elements may be optionally included in the above example:

| | |
|---|---|
| Susceptor Pretreatment: | Anodized Aluminum Surface, both sides |
| Primer Layer: | Silane Coupling Agent Pretreatment, both sides |
| Supplemental Bonding Adhesive: | Acrylic Pressure Sensitive, Medium Tack, 10° C. to 35° C. |
| Supp. Bonding Adhesive Form: | Three dimensional overlapping ¾" by 2" oval swirl, 1/32" wide bead |

EXAMPLE 2

Figure 10:
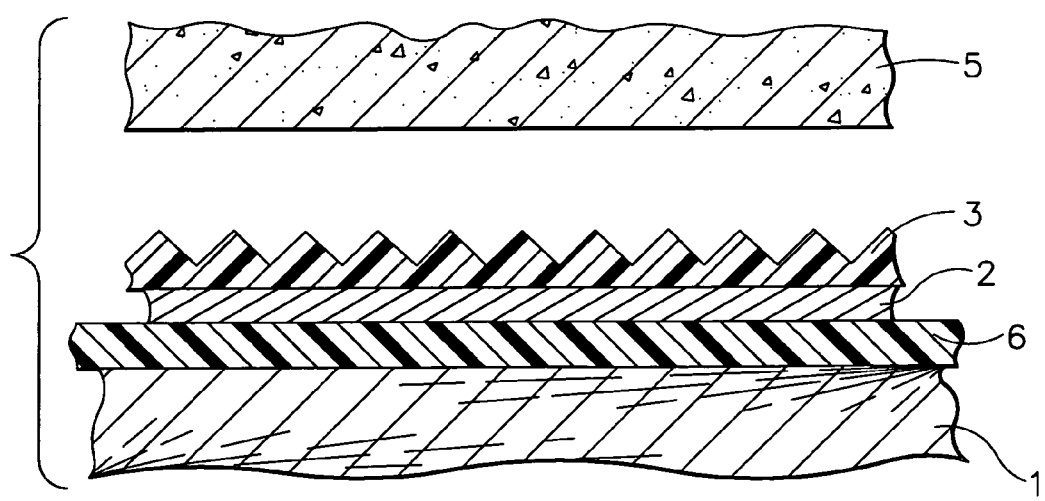
FIG. 10 is a side view of the embodiment described in Example 2.

Bonding a substrate to a target substrate with a pre-attached adhesive system continuous to the susceptor and discontinuous to the target substrate (see FIG. 10).

All preparation conditions are as in Example 1, but with some changes in the technique of bonding the adhesive coating (3). In these cases, a continuous layer of adhesive is contiguous to all or a significant portion of the susceptor. Continuous susceptor contact will be utilized when a longer bond time is required (typically greater than 1 second, but still less than 1 minute) to deliver more energy to the adhesive; a lower melting point and/or curing adhesive is employed as all or part of the bonding adhesive system, or both. Where the susceptor is generally flat (out-of-plane distortions are less than 10% or if greater than 10% cover less than 10% of the susceptor), generally a total layer thickness variation of at least 10% is the desired difference between the low points to the high points, with 25% or greater more preferred, and at least 50% or greater being the most preferred. Where the susceptor is itself textured (a greater than 10% difference in out of plane distortions over more than 10% of the susceptor), generally a total layer adhesive and susceptor thickness variation of at least 10% is the desired difference between the low points to the high points, with 25% or greater more preferred, and at least 50% or greater being the most preferred. In this embodiment, coating techniques provide for the impression or creation of texture, either randomly, ordered or both at the top of the adhesive layer, while still maintaining the continuous layer below. The discontinuous substrate contact adhesive layer may be applied as in Example 1 over a previously applied layer of adhesive which may or may not be the same. One or more adhesives can be used in this layer or the continuous susceptor contact layer. Alternatively, the texture may be introduced through embossing or any similar technique that accomplishes the same or similar result. A modified spray or roll technique may also be utilized, such a notched or grooved knife or spray nozzles that deliver varying amounts of adhesive to different locations over time. Specific methods and equipment include gravure printing, hot melt gravure printing, knife over roll, roll coating and any variety of adhesive stripping, stitching, printing or spraying techniques. The adhesive may or may not be foamed on all or part of the adhesive layers. Manufacturers of the equipment are as cited above. Preferred geometric patterns and shapes will vary based upon the individual needs of the application.

The specific components used in making the described fastening devices are as follows:

---

Example 2A-Interior Wood Moldings

| | |
|---|---|
| Substrate: | Wood |
| Target Substrate: | Paper or Acrylic Emulsion Coated Drywall |
| Attachment Adhesive: | Water-Based Emulsion Laminating Adhesive, 40% Solids |
| Susceptor: | 0.50 mil aluminum foil |
| Bonding Adhesive: | Polyamide, 190° C. Melt Point |
| Bonding Adhesive Form: | 1.5 mil continuous coat over entire susceptor or portions of the susceptor in the form of larger geometric shapes or stripes, straight or wavy. A heated embossing die follows after initial cooling to a solid state to impress 0.75 mil high pyramids for a total final layer thickness of about 2.0 mils. |

The following elements may optionally be included in the above example:

| | |
|---|---|
| Susceptor Pretreatment: | Anodized Aluminum Surface, both sides; texturing, rounded, on all or part of the susceptor. |
| Primer Layer: | Silane Coupling Agent Pretreatment, both sides |
| Supplemental Bonding Adhesive: | Acrylic Pressure Sensitive, Medium Tack 10° C. to 35° C.. In this case, flat topped pyramids on all or a portion of the impressed areas will be incorporated to achieve the desired temporary holding effect. The overall impression geometry is selected so that all pyramid tops are approximately the same height after all coats are applied. |
| Supp. Bonding Adhesive Form: | Applied to flat topped pyramid areas 0.25 mils thick |

Example 2B-Interior Wood Moldings

| | |
|---|---|
| Substrate: | Wood |
| Target Substrate: | Paper or Acrylic Emulsion Coated Drywall |
| Attachment Adhesive: | Water-Based Emulsion Laminating Adhesive, 40% Solids |
| Susceptor: | 0.50 mil aluminum foil |
| Bonding Adhesive: | EVA, 180° C. Melt Point |
| Bonding Adhesive Form: | Inert gas pre-foamed adhesive, which is continuous to the susceptor, and discontinuous to the target substrate due to the irregular surface caused by inert gas. |

The following elements may optionally be included in the above example:

| | |
|---|---|
| Susceptor Pretreatment: | Anodized Aluminum Surface, both sides; texturing, rounded, on all or part of the susceptor. |
| Primer Layer: | Silane Coupling Agent Pretreatment, both sides |
| Supplemental Bonding Adhesive: | Acrylic Pressure Sensitive, Medium Tack, 10° C. to 35° C.. In this case, flat topped pyramids on all or a portion of the impressed areas will be incorporated to achieve the desired temporary holding effect. The overall impression geometry is selected so that all pyramid tops are approximately the same height after all coats are applied. |
| Supp. Bonding Adhesive Form: | Applied to flat topped pyramid areas 0.25 mils thick |

EXAMPLE 3

Bonding two target substrates with adhesive tapes having discontinuous susceptor contact and/or discontinuous substrate contact (see FIGS. 11–15).

Figure 11:
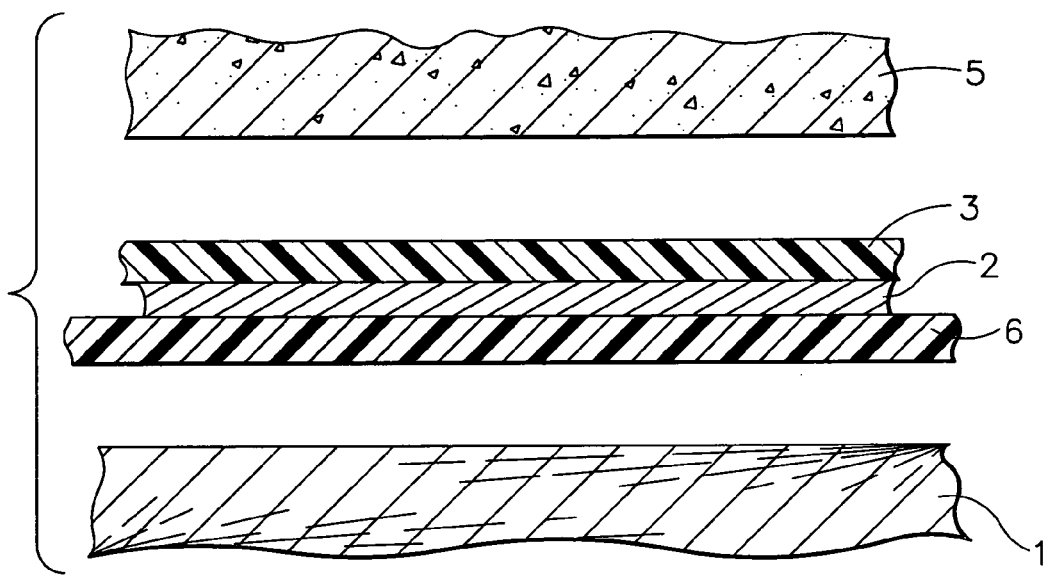
FIGS. 11, 12 and 13 show side views of two embodiments described in Example 3.
Figure 12:
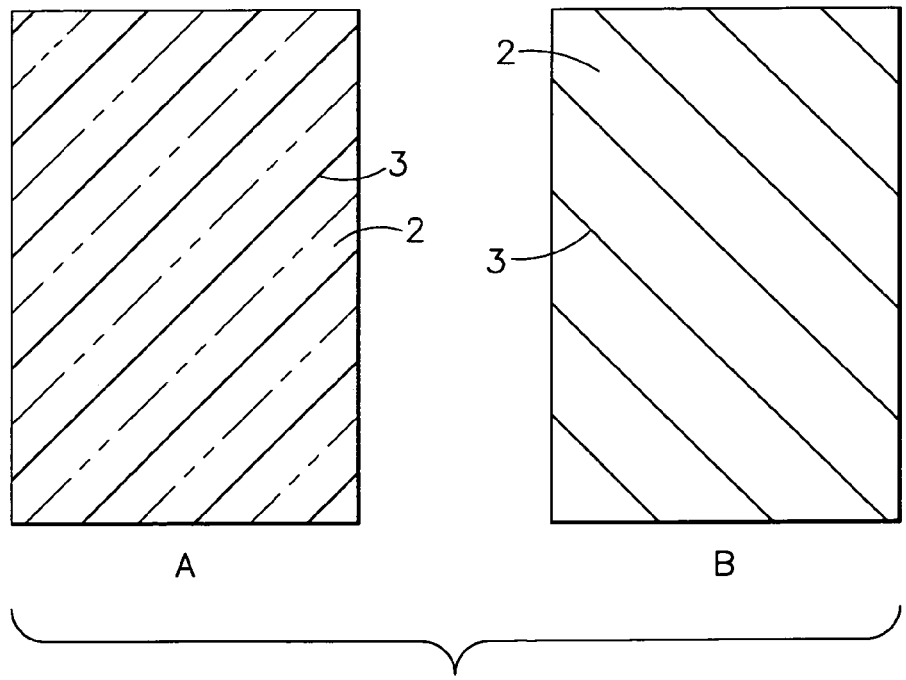
Figure 13:
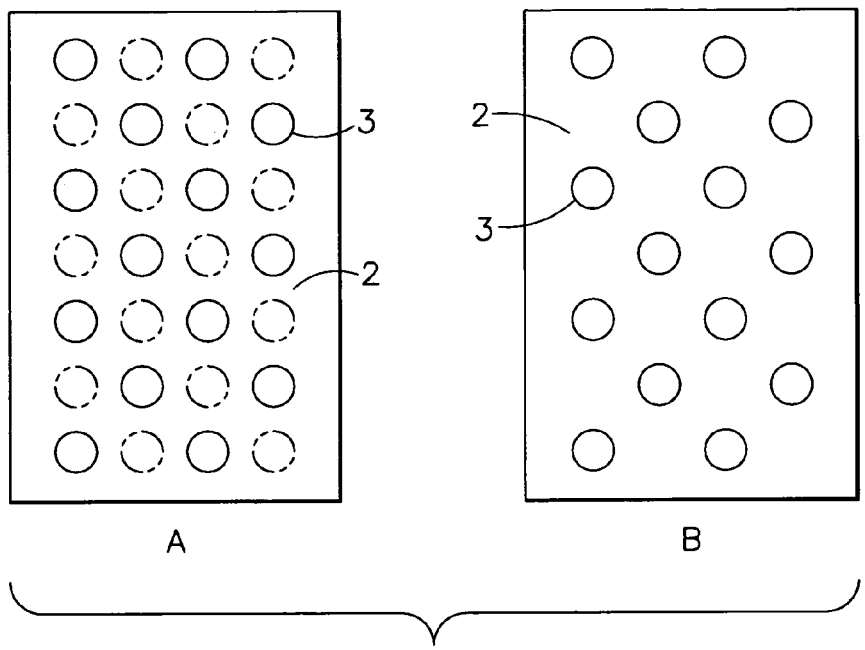
Figure 14:
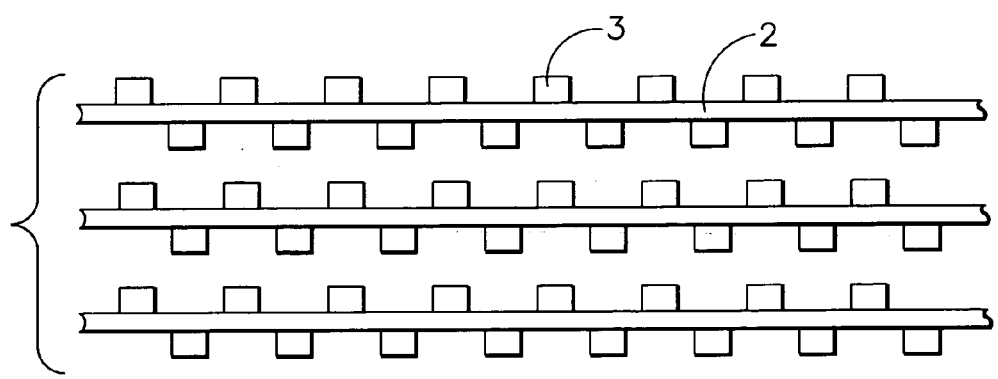
FIGS. 14 and 15 show top views of adhesive placement patterns which exemplify those used in such embodiments.
Figure 15:
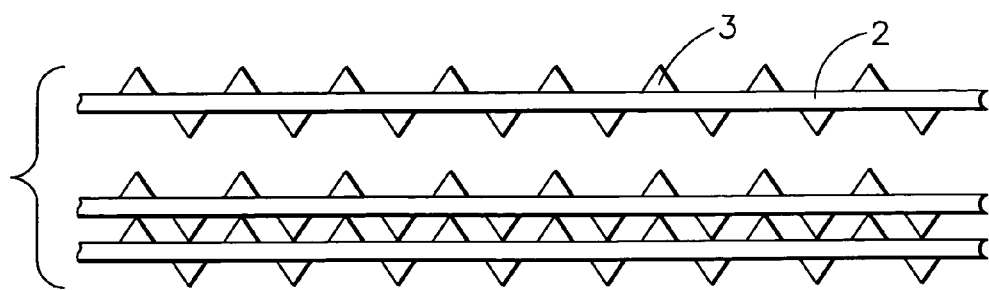

We can also produce the article in the form of a tape or a sheet, by taking a susceptor and placing adhesive on both sides (FIG. 11). Either both sides are discontinuous adhesive (either to the substrate, the susceptor, or both) or one side is continuous and one side is discontinuous. All of the same considerations for susceptor pre-treatments and primers may be utilized, but there is no pre-attachment to a substrate. Rather, a heat activateable adhesive system is placed upon at least one side, with that one side being at least a discontinuous side. It is possible that one side could be a continuous or discontinuous susceptor contact pressure sensitive adhesive that for the purposes of the bonding method is not adversely effected by the heating during the fastening process. On either or both sides of the susceptor, the substrate target adhesive layer is placed with all of the same considerations as in Example 1 or Example 2.

Of particular importance are the actual forms of the final adhesive systems. The systems can be applied to wide (many feet) or narrow (¼") webs and then be rolled for dispensing, ease of storage, ease of transportation and packaging, and convenient future application. By properly selecting the adhesive patterns, the key aspects of this invention may be practiced without sacrificing the ability to conveniently form and use rolls. For example, while spun webs and very thin, generally less than 1 mil, adhesive layers may be more often than not readily rolled without surface defects effecting the roll's conformation and quality, thicker discontinuities can effect the roll's conformation and quality. This problem may be mitigated by selecting certain patterns based upon the depth, width, and geometry of the discontinuity to provide for a nesting effect when the adhesive device is rolled up or wound. In general, alternating patterns on some scale on the two sides of the susceptor are required. Such nesting provides, particularly where the fit is tight on rolling, for easy to unwind, handle, and transport rolls, particularly transport within smaller volume spaces for a given system. The same concept applies to sheets as well, rigid, semi-rigid, or flexible. Examples of such complementary patterns are shown in FIGS. 12–15.

All of the variations discussed for Example 1 and Example 2 are relevant, except that the target substrate adhesive layers are on both sides and are interchangeable to accommodate two or more different substrates. Also, as already noted, one side may have a pressure sensitive coating with all of the above-mentioned qualities, including, but not limited to, being continuous or discontinuous with respect to either the susceptor or the substrate and being optionally reactive.

EXAMPLE 4

Bonding two target substrates with an in-line assembled adhesive device.

Any of the above examples can be utilized with a solid, semi-solid, or liquid adhesive system when the adhesive device is constructed in-line virtually simultaneously. The main key is that with a semi-solid or liquid adhesive involved, the bonding or heating step will occur almost immediately after the device is constructed, with some predetermined amount of pressure, for example 5 psi, per unit area of minimum adhesive contact. Parts of the device construction may be partially prepared beforehand or not, as in a partially constructed tape form where all the solid components are pre-applied, but the final liquid layer is added in-line.

| Example 5-Wood Cabinetry Trim & Facings | |
|---|---|
| Substrate: | Wood |
| Target Substrate: | Wood |
| Attachment Adhesive: | Spunfab web adhesive PA1541 |
| Susceptor: | 0.50 mil aluminum foil |
| Bonding Adhesive: | Spunfab web adhesive PA1541 |
| Bonding Adhesive Form: | Spun adhesive web, open weave, with a weight of 27 grams per square meter or 0.8 oz per square yard |
| Optional components: | |
| Susceptor Pretreatment: | Anodized Aluminum Surface, both sides |
| Primer Layer: | Silane Coupling Agent Pretreatment, both sides |
| Supplemental Bonding Adhesive: | Acrylic Pressure Sensitive, Medium Tack 10° C. to 35° C. |
| Supp. Bonding Adhesive Form: | Increase or decrease the adhesive weight per area. |

The adhesive web can be pre-applied or laminated to the susceptor, on one or both sides of the susceptor. The susceptor is then positioned between the substrate and target substrate for bonding with the induction tool. An alternative method would be to use a hand lay-up method. The adhesive web can be cut and properly sized, then placed on the target substrate. The susceptor, also properly sized, is then placed on top of the web adhesive. A second layer of web adhesive, properly sized, is then placed on top of the susceptor. Finally, the substrate is placed on top of the second adhesive web layer. The bond is then formed by applying slight pressure, compressing all layers to ensure intimate contact, then activating the induction tool forming the bond.

| Example 6-Fabrics, Textiles | |
|---|---|
| Substrate: | Cotton fabric |
| Target Substrate: | Cotton fabric |
| Attachment Adhesive: | Spunfab web adhesive PA1541 |
| Susceptor: | 0.50 mil aluminum foil |
| Bonding Adhesive: | Spunfab web adhesive PA1541 |
| Bonding Adhesive Form: | Spun adhesive web, open weave, with a weight of 27 grams per square meter or 0.8 oz per square yard |
| -continued | |
|---|---|
| Optional components: | |
| Susceptor Pretreatment: | Anodized Aluminum Surface, both sides |
| Primer Layer: | Silane Coupling Agent Pretreatment, both sides |
| Supplemental Bonding Adhesive: | Acrylic Pressure Sensitive, Medium Tack 10° C. to 35° C. |
| Supp. Bonding Adhesive Form: | Increase or decrease the adhesive weight per area. |

The adhesive web can be pre-applied or laminated to the susceptor, on one or both sides of the susceptor. The susceptor is then positioned, automatically or by hand, between the substrate and target substrate for bonding with the induction tool. An alternative method would be to use a hand lay-up method. The adhesive web can be cut and properly sized, then placed on the target substrate. The susceptor, also properly sized, is then placed on top of the web adhesive. A second layer of web adhesive, properly sized, is then placed on top of the susceptor. Finally, the substrate is placed on top of the second adhesive web layer. The bond is then formed by applying slight pressure, compressing all layers to ensure intimate contact, then activating the induction tool forming the bond.

| Example 7-Paper and Paper Products | |
|---|---|
| Substrate: | Corrugated box stock |
| Target Substrate: | Corrugated box stock |
| Attachment Adhesive: | Spunfab web adhesive PA1541 |
| Susceptor: | 0.50 mil aluminum foil |
| Bonding Adhesive: | Spunfab web adhesive PA1541 |
| Bonding Adhesive Form: | Spun adhesive web, open weave, with a weight of 27 grams per square meter or 0.8 oz per square yard |
| Optional components: | |
| Susceptor Pretreatment: | Anodized Aluminum Surface, both sides |
| Primer Layer: | Silane Coupling Agent Pretreatment, both sides |
| Supplemental Bonding Adhesive: | Acrylic Pressure Sensitive, Medium Tack 10° C. to 35° C. |
| Supp. Bonding Adhesive Form: | Increase or decrease the adhesive weight per area. |

The adhesive web can be pre-applied or laminated to the susceptor, on one or both sides of the susceptor. The susceptor is then positioned, automatically or by hand, between the substrate and target substrate for bonding with the induction tool.

An alternative method would be to use a hand lay-up method. The adhesive web can be cut and properly sized, then placed on the target substrate. The susceptor, also properly sized, is then placed on top of the web adhesive. A second layer of web adhesive, properly sized, is then placed on top of the susceptor. Finally, the substrate is placed on top of the second adhesive web layer. The bond is then formed by applying slight pressure, compressing all layers to ensure intimate contact, then activating the induction tool forming the bond.

EXAMPLE 8

Bonding a substrate with a pre-attached adhesive system continuous to both the susceptor and the target substrate, where the adhesive is a reactive pressure sensitive adhesive (see FIG. 6).

Take a substrate, and attach the susceptor with a liquid or semi-solid adhesive system employing either a brush, roller, or other equipment to sufficiently spread the adhesive, reactive or unreactive, immediately or latently, and allow the volatiles, if any, to evaporate until the adhesive reaches a tacky state. Examples of such processes include, but are not limited to, extrusion coating, knife over roll coating, and airless spray coating. Representative process equipment manufacturers include Nordson Corporation, May Coatings or Rototherm. It is possible that one side could be a continuous or discontinuous susceptor contact pressure sensitive adhesive that for the purposes of the bonding method is not adversely effected by the heating during the fastening process. Under those conditions, the susceptor may be pre-coated with the pressure sensitive adhesive on one side and then be pre-applied by a hand-held or automated roller or unwinding system with or without pressure. A heat curable component or element could then be incorporated chemically or by formulation to convert the pressure sensitive adhesive during the bonding process. Insulating agents may be optionally added to this continuous layer to obviate thermal losses without impairing desired ultimate strength in tension, shear, or peel under specific environmental conditions. Examples of insulating agents include, but are not limited to, air, nitrogen, argon, other gases, and microballoons. Fillers and/or reinforcing agents may also be added. Either before, after, or during this phase, the susceptor may be itself textured. The susceptor may also optionally contain holes or perforations to facilitate adhesive flow through the susceptor or to facilitate adhesive system separation, as with a postage stamp. The susceptor may also have its outer edges follow a geometric pattern, particularly mathematically smooth ones that facilitate edge heating without localized run-away heating. The susceptor may also have on one or both sides a reinforcing layer composed of a thin (less than 5 mils) plastic or reinforced plastic to facilitate susceptor handling and tear resistance.

Either after the susceptor is affixed or during susceptor manufacture or processing, a primer, such as a silane, to alter adhesion may be optionally coated onto either or both sides of the susceptor, continuously or discontinuously. Furthermore, an aluminum surface pretreatment, including, but not limited to, anodization, plasma treatment, acid etching may also be optionally conducted on either or both sides of the susceptor, continuously or discontinuously.

Once the susceptor is suitably affixed to the trim or molding, the top continuous adhesive layer is applied as a continuous film, potentially as described above for the lower adhesive layer or pre-applied to the foil in a wide web and subsequently slit or otherwise processed prior to application to the substrate. For wooden trim, a pressure sensitive peroxide-initiated reactive acrylic functional polyester or polyamide adhesive may be used. Alternatively solid phenolic adhesives, such as those used for electric lead frames may be used. The continuous adhesive film may be flat or alternatively may be impressed with a pattern for discontinuous substrate contact. It should be noted that in many cases where speed of bond formation is critical (less than 0.5 seconds), adhesive placement will be biased toward the edges, where heat will build up the most rapidly.

The curable, adhesives used here, particularly latently or heat activateable ones, are typically used where environmental durability or creep resistance is important. Fillers and/or reinforcing agents may also be added to achieve a desired performance effect. Again, examples include extrusion coating, knife over roll coating, airless spray, gravure printing and hot melt gravure printing. A continuous pattern adhesive can be applied via any standard coating technique such as rolling, spray, film lamination, and aqueous emulsion. Representative process equipment manufactures include Nordson Corporation, May Coatings or Rototherm. For highly pattern specific technologies, one skilled in the art will be able to utilize many of the advancements in nozzle and micro nozzle technologies for liquids and hot melt adhesives. This allows for precise control over the amounts and location of adhesive deposited on the substrate. These advancements enable for the excellent control of the deposition for discontinuous adhesive patterns, webs, sprays, dots and swirl patterns. Several of Nordson Corporation's processes, such as Select Coat™, Control Coat™ or Porous Coat™ are examples of highly controlled discontinuous coating techniques. Lamination can be utilized for continuous, film adhesive webs.

The attachment and/or bonding adhesive materials can be foamed during or after the manufacturing process, depending upon the specific application requirements. Adhesives that foam during bonding are meant to fill gaps. When prefoamed, the foam adhesives can be in a continuous layer. In this case, the continuous layer in contact with the susceptor is considered the very thin supplemental layer. Foaming may occur by the use of chemical blowing agents, as well as the use of dissolving inert gases in the adhesive (Nordson Foam Melt System). The specific requirements might be viscosity during or after processing, mechanical properties of the adhesive, gap filling specifications and/or environmental performance needs. When employed for structural applications, foaming should generally produce a foam density of no more than 65% of the density of the base unblown adhesive in order to maintain major performance characteristics, such as strength. It is further possible to bias the foaming under any circumstance to those portions of the target substrate adhesive layer that are actually in contact with either the susceptor and/or the substrate.

| Example 8A-Interior Wood Moldings | |
|---|---|
| Substrate: | Wood |
| Target Substrate: | Paper or acrylic emulsion coated drywall |
| Attachment Adhesive: | Water-based emulsion laminating adhesive, 40% solids |
| Susceptor: | 0.50 mil aluminum foil |
| Bonding Adhesive: | Polyamide, 190° C. Melt Point |
| Bonding Adhesive | Continuous film, flat, uniform thickness over the entire susceptor or only the edges to about 0.25 inches wide at each edge. |
| Optional components | |
| Attachment Adhesive: | As above for the bonding adhesive, in varying forms: Two to twelve linear, hemispherical stripes about 0.1 inch in width and 0.5 inch in length on each edge of the susceptor, about 0.1 inch from the edge and about 0.1 inch apart. Continuous film of adhesive over all or the edges of the susceptor with an impressed or relief patterns of hills, ridges, or pyramidal structures over all or part of the adhesive surface. |

-continued

| | |
|---|---|
| | Continuous film of adhesive over all or the edges of the susceptor with no impressed or relief patterns. |
| Susceptor Pretreatment: | Anodized aluminum surface, both sides, or equivalent porosity producing treatment. |
| Primer Layer: | Silane coupling agent pretreatment, both sides |
| Discontinuous Adhesive Forms: | Two or three linear, hemispherical stripes about 0.1 inch in width and 0.5 inch in length on each edge of the susceptor, about 0.1 inch from the edge and about 0.1 inch apart. Continuous film adhesive over all or the edges of the susceptor with an impressed pattern of hills, ridges, or pyramidal structures. |
| Example 8B-Wood Cabinetry and Furniture Structural Elements (Cases, Face Frames Doors | |
| Substrate: | Wood |
| Target Substrate: | Wood |
| Attachment Adhesive: | Pressure-sensitive reactive urethane-based acrylic adhesive, moderate tack, 90° C. melt point |
| Susceptor: | 0.50 mil aluminum foil |
| Bonding Adhesive: | Pressure-sensitive reactive urethane-based acrylic adhesive, moderate tack, 90° C. melt point |
| Bonding Adhesive Form: | 1/16 inch average width dots or geometric shapes gravure printed to 2–3 mil average height in a diamond array where each dot or shape has an average of 1/8 inch between them in any direction. |
| Optional components | |
| Susceptor Pretreatment: | Anodized aluminum surface, both sides, or equivalent porosity producing treatment. |
| Primer Layer: | Silane coupling agent pretreatment, both sides |
| Supp. Bonding Adhesive Form: | 1/16 inch average width dots or geometric shapes gravure printed to 2–3.5 mil average height in a diamond array where each dot or shape has an average of 1/8 inch between them in any direction. Patterns printed such that supplemental adhesive dots replace 15% of the bonding adhesive dots. |

Although a number of specific embodiments have been described and exemplified in the present application, those illustrations and examples are not intended to be limiting of the scope of the present invention which is intended to include all embodiments and their equivalents as defined by the following claims.

What is claimed is:

1. A reversible, induction activatable fastening device for promoting the assembly and disassembly of associated pieces upon exposure to electromagnetic energy in the range of from 1.0 to 1000 kHz, said fastening device comprising a susceptor sheet having a thickness of no greater than about 2 mils and a thermoplastic adhesive whose softening temperature is at least 60° C. on at least one surface of said susceptor, (i) wherein the thermoplastic adhesive, as applied to said at least one surface, contacts from about 1% to about 65% of the surface area of said susceptor and has a pattern such that at least about 75% of the area of surface contact between the adhesive and said susceptor can have inscribed within it circles having a diameter of from about 1/2" to about 0.001" and (ii) wherein the thermoplastic adhesive on said at least one surface of the susceptor is applied in such a manner that a) when in touch contact with a substrate congruent in shape to the susceptor, a Test Surface, from about 1% to about 65% of the surface area of the Test Surface is in contact with the thermoplastic adhesive and at least about 75% of that contact area can have inscribed within it circles having a diameter of from about 1/2" to about 0.001" and b) when in bonded relationship with said Test Surface, from about 1% to about 65% of the surface area of the Test Surface is in contact with the adhesive: the bonded relationship having been established by mating the adhesive device and the Test Surface under a force of about 5 psi and heating the same to a temperature that is about 10° C. above the melt temperature of the thermoplastic adhesive for a sufficient time to allow the thermoplastic adhesive to melt and subsequently allowing the adhesive to cool.

2. The fastening device according to claim 1 wherein at least about 75% of the area of surface contact between the adhesive and said Test Surface can have inscribed within it circles having a diameter of about 1/4" to about 0.001".

3. The fastening device according to claim 1 wherein at least about 75% of the area of surface contact between the adhesive and the susceptor surface can have inscribed within it circles having a diameter of about 1/4" to about 0.001".

4. The fastening device according to claim 3 wherein from about 1% to about 30% of the surface area of the susceptor is in contact with the adhesive.

5. The fastening device according to claim 1 wherein the area of surface contact between the adhesive and the Test Surface is less than the area of surface contact between the adhesive and the susceptor.

6. The fastening device according to claim 1 additionally comprising a supplemental layer having a thickness of up to about 10 mils between the susceptor and the adhesive.

7. The fastening device according to claim 6 wherein the supplemental layer is selected from the group consisting of insulation, foam, scrim, a paper material, a thermoplastic material, and mixtures thereof.

8. The fastening device according to claim 1 which additionally comprises a primer located on the surface of the susceptor sheet between the susceptor and the adhesive layer.

9. The fastening device according to claim 1 wherein at least about 75% of the area of surface contact between the adhesive and said Test Surface can have inscribed within it circles having a diameter of about 1/4" to about 0.001"; from about 1% of to about 15% of the surface area of the Test Surface is in pre-bonding contact with the adhesive; and when in the bonded relationship with said Test Surface, from about 1% to about 35% of the surface area of the Test Surface is in contact with the adhesive.

10. The fastening device according to claim 9 wherein the adhesive is applied in a discontinuous manner.

11. The fastening device according to claim 9 wherein when in the bonded relationship with said Test Surface, from about 5% to about 25% of the surface area of the Test Surface is in contact with the adhesive.

12. The fastening device according to claim 1 wherein the susceptor is selected from metallic foils and non-metallic foils.

13. The fastening device according to claim 1 wherein the susceptor's surface is textured.

14. The fastening device according to claim 1 wherein the susceptor's surface is perforated.

15. The fastening device according to claim 1 wherein the adhesive includes both hot-melt adhesive and pressure sensitive adhesive.

16. The fastening device according to claim 1 wherein the adhesive is selected from bet-melt adhesives, curable adhesives, and mixtures thereof.

17. The fastening device according to claim 16 wherein the hot-melt adhesive is selected from polyamides, polyolefins, ethylene/vinyl acetate copolymers, and mixtures thereof.

18. The fastening device according to claim 1 wherein the susceptor is a metallic foil comprising materials selected from the group consisting of metallic fibrous materials, conductive metal materials, conductive magnetic materials, and mixtures thereof.

19. The fastening device according to claim 18 wherein the metallic foil is made from a metal selected from the group consisting of steel, copper, iron, nickel, tin, aluminum, and mixtures thereof.

20. The fastening device according to claim 19 wherein the susceptor sheet has a thickness of no greater than about 1 mil.

21. The fastening device according to claim 20 wherein the susceptor sheet is made from aluminum foil.

22. The fastening device according to claim 21 wherein the adhesive is placed on the susceptor in the form of a web configuration selected from random webs, ordered webs and mixtures thereof.

23. The fastening device according to claim 22 wherein the adhesive is a polyamide.

24. The fastening device according to claim 23 wherein the adhesive is located on one face of the susceptor.

25. The fastening device according to claim 23 wherein the adhesive is located on both faces of the susceptor.

26. The fastening device according to claim 25 in the form of a nestable tape.

27. The fastening device according to claim 21 wherein the adhesive is present on the susceptor sheet in a discontinuous pattern selected from spots, lines, cones, pyramids, cylinders, cubes, spheres, stars and mixtures thereof.

28. The fastening device according to claim 27 wherein the adhesive is a polyamide.

29. The fastening device according to claim 28 wherein the adhesive is located on one side of the susceptor.

30. The fastening device according to claim 28 wherein the adhesive is located on both sides of the susceptor.

31. The fastening device according to claim 1 wherein the adhesive is located on one surface of the susceptor sheet.

32. The fastening device according to claim 1 wherein the adhesive is located on both surfaces of the susceptor sheet.

33. The fastening device according to claim 1 wherein the adhesive is present on the susceptor sheet in the form of a web configuration selected from random webs, ordered webs, and mixtures thereof.

34. The fastening device according to claim 1 wherein the adhesive is concentrated close to the edges of the susceptor.

35. The fastening device according to claim 1 wherein the adhesive is present on the susceptor sheet in a discontinuous pattern.

36. The fastening device according to claim 35 wherein the adhesive is placed on the susceptor sheet in a pattern selected from spots, lines, cones, pyramids, cylinders, cubes, spheres, donuts, stars, and mixtures thereof.

37. The fastening device according to claim 36 wherein the adhesive decreases in cross-sectional area as one moves away from the susceptor and toward the surface to be bonded.

38. The fastening device according to claim 1 formulated in the form selected from moldings, wall coverings, wallboard, laminates, carpeting, fabric and floor coverings.

39. The fastening device according to claim 1 wherein the susceptor is selected from the group consisting of foils, agglomerated threads, agglomerated particles and mixtures thereof.

40. The fastening device according to claim 1 activated by electromagnetic energy having a frequency of about 500 kHz or less.

41. The fastening device according to claim 9 wherein at least about 75% of the area of surface contact between the adhesive and said Test Surface can have inscribed within it circles having a diameter of about 3/16" to about 0.001".

42. The fastening device according to claim 1 which is substantially flat.

43. The fastening device according to claim 1 wherein the susceptor is an aluminum foil.

44. The fastening device according to claim 43 wherein the adhesive is a polyamide.

45. The fastening device according to claim 43 wherein the adhesive is located on one face of the susceptor.

46. The fastening device according to claim 43 wherein the adhesive is located on both faces of the susceptor.

* * * * *